US009726833B2

(12) United States Patent
Basile et al.

(10) Patent No.: US 9,726,833 B2
(45) Date of Patent: Aug. 8, 2017

(54) INTERCONNECTION SYSTEMS BETWEEN SIGNAL SWITCHING CIRCUIT BOARDS

(71) Applicant: CONSIGLIO NAZIONALE DELLE RICERCHE, Rome (IT)

(72) Inventors: Vito Basile, Bari (IT); Irene Fassi, Bergamo (IT); Gianluca Guadagno, Bari (IT)

(73) Assignee: CONSIGLIO NAZIONALE DELLE RICERCHE, Rome (IT)

( * ) Notice: Subject to any disclaimer, the term of this patent is extended or adjusted under 35 U.S.C. 154(b) by 0 days.

(21) Appl. No.: 14/901,173

(22) PCT Filed: Jun. 24, 2014

(86) PCT No.: PCT/IB2014/062562
§ 371 (c)(1),
(2) Date: Dec. 28, 2015

(87) PCT Pub. No.: WO2014/207657
PCT Pub. Date: Dec. 31, 2014

(65) Prior Publication Data
US 2016/0139348 A1    May 19, 2016

(30) Foreign Application Priority Data

Jun. 26, 2013 (EP) .................................... 13425089

(51) Int. Cl.
*G02B 6/38* (2006.01)
*G02B 6/44* (2006.01)
(Continued)

(52) U.S. Cl.
CPC ........... *G02B 6/3897* (2013.01); *G02B 6/381* (2013.01); *G02B 6/3879* (2013.01);
(Continued)

(58) Field of Classification Search
CPC ................................................... G02B 6/3897
See application file for complete search history.

(56) References Cited

U.S. PATENT DOCUMENTS 5,980,312 A * 11/1999 Chapman ............. G02B 6/3817
361/788
2007/0154160 A1   7/2007 Tourne
(Continued)

FOREIGN PATENT DOCUMENTS

EP          0929199 A      7/1999
EP          1162467 A     12/2001
(Continued)

OTHER PUBLICATIONS

Flexible High Density Optical Circuits, by M. Shahld et al., www.ofsoptics.com.
(Continued)

*Primary Examiner* — Omar R Rojas
(74) *Attorney, Agent, or Firm* — Arent Fox LLP

(57) ABSTRACT

An optical interconnection assembly for the mutual connection of a plurality of signal switching circuit boards that may be coupled to a common planar support, backplane, includes a planar support frame, adapted to receive an ordered arrangement of connectors, which includes a series of first connectors arranged to face corresponding signal transmission ports of said boards, and a series of second connectors arranged to face corresponding signal reception ports of the boards. The support frame is adapted to guide the deployment of an interconnection circuit between corresponding pairs of first and second connectors. The interconnection circuit includes a plurality of arrangements of aggregated interconnection optical fibers extending along a longitudinal axis of the arrangement; and controlled deformation guide formations of the optical fiber arrangements, arranged to
(Continued)

establish a plurality of non-intersecting coplanar paths of the optical fiber arrangements between corresponding pairs of first and second connectors.

14 Claims, 18 Drawing Sheets

(51) Int. Cl.
  *G02B 6/35* (2006.01)
  *G02B 6/36* (2006.01)
(52) U.S. Cl.
  CPC ......... *G02B 6/4403* (2013.01); *G02B 6/4478* (2013.01); *G02B 6/3502* (2013.01); *G02B 6/3556* (2013.01); *G02B 6/3608* (2013.01)

(56) References Cited

U.S. PATENT DOCUMENTS

| | | |
|---|---|---|
| 2008/0002936 A1 | 1/2008 | Sun |
| 2011/0211801 A1 | 9/2011 | McGranahan |

FOREIGN PATENT DOCUMENTS

| | | |
|---|---|---|
| EP | 1182483 A | 2/2002 |
| EP | 1273948 A | 1/2003 |
| WO | WO 02/063365 A | 8/2002 |
| WO | WO 2005/114286 A | 12/2005 |

OTHER PUBLICATIONS

PCT/IB2014/062562 ISR dated Oct. 17, 2014.
PCT/IB2014/062562 Written Opinion, mailed Oct. 17, 2014.

\* cited by examiner

INTERCONNECTION SYSTEMS BETWEEN SIGNAL SWITCHING CIRCUIT BOARDS

CROSS REFERENCE TO RELATED APPLICATIONS

This application is a National Stage entry of International Application No. PCT/IB2014/062562, filed Jun. 24, 2014, which claims priority to European Patent Application No. 13425089.3, filed Jun. 26, 2013. The disclosures of these priority applications are incorporated in their entirety herein by reference.

FIELD OF THE INVENTION

The present invention relates to the communications field, particularly optical communications, and more particularly it relates to the interconnection systems between signal switching boards.

Still more particularly, the invention relates to an optical interconnection assembly for the mutual connection of a plurality of signal switching circuit boards that may be coupled to a common planar support or backplane, to an assembling procedure of an optical interconnection assembly, and an interconnection system comprising a plurality of optical interconnection assemblies between a plurality of signal switching circuit boards.

BACKGROUND

Nowadays, the information and communication technologies implementing information transmission, reception and processing systems, particularly in the form of digital signals, require infrastructures and switching centers with apparatuses having a high density and capacity. The required capacity values can be obtained only by using an optical fiber transmission technology, by virtue of the transmission band width offered by the optical fibers.

The apparatuses composing the switching centers at the nodes of a communication network typically include a plurality of signal switching boards, assembled to an electrical interconnection and mechanical support board that is referred to as a "backplane". The physical connection (interconnection) between the boards is implemented by one or more optical fiber interconnection circuits assembled on the backplane or in the proximity thereof, arranged to connect each board to all the other ones, according to a full-mesh connection architecture.

The prior art for implementing the interconnection systems at the switching nodes of a network is based on assembling the switching boards on a side of the backplane by suitable connectors, and on the arrangement of outer, flexible, optical interconnection circuits on the opposite side of the backplane, as schematically shown in FIG. 1, where the switching boards in a cabinet C of a telephonic switching center are indicated with S, the backplane board is indicated with B, and the rear interconnection circuit is indicated with I.

Examples of commercial interconnection circuits that have characteristic of easiness of handling and reduced overall dimensions in the arrangement of optical interconnection conductors are the product FlexPlane by Molex, www.molex.com and the product LIGHTRAY OFX by Tyco Electronics, www.te.com.

Such interconnection circuit, schematically shown in FIG. 2, comprises a first plurality of fiber optic ribbons R1-R8 at a first end portion, and a corresponding second plurality of fiber optic ribbons R1'-R8' at a second opposite end portion, in which each ribbon is crimped at an end with terminal devices for the mechanical and electro-magnetic coupling to the backplane connectors.

Each fiber optic ribbon Ri includes a preset number of fibers Fi (i=1, n), where n is typically equal to 8, 12, 16, 32, aligned parallel along a longitudinal extension axis of the ribbon in a planar arrangement, bundled and held in place by a sheath G, as schematically represented in FIG. 3.

In the interconnection circuit, the ribbons have, downstream of the corresponding terminal, a portion embedded in a case L that is mechanically more rigid than the optical fibers, within which they are unsheated, thus releasing the single optical fibers, which are routed separately, each towards a different connector on the opposite side. The routing circuit of optical fibers that is formed in the case L keeps a suitable flexibility, which allows assembling the ribbon terminals to the backplane connectors.

This technique is described, for example, in WO 2005/114286 A1, US 2008/002936 A1, and in WO 02/63365, and in the publication "*Flexible High Density Optical Circuits*", by Muhammed A. Shahid, Peng Wang, Jeffery H. Hicks, OFS, 2000 Northeast Expressway, Norcross, Ga. 30071 (www.ofsoptics.com). The routing of the circuit, i.e., the separation of the fibers from the ribbons and the routing towards another connector of the single fibre, subsequently embedded in another ribbon, are carried out, for example, by means of the apparatus as described in EP 1 182 483 A1.

However, these solutions have the drawbacks of a complex implementation and a not easy maintenance, since a failure in a fiber requires, in fact, to replace the entire flexible circuit and the corresponding connectors.

US 2007/0154160 A1 proposes a device implementing a controlled deformation (specifically, a folding) of a fiber optic ribbon associated with a backplane board, so that it is possible to build a connection end for assembling switching boards orthogonal to the backplane, while, on the backplane board side opposite to the connection end, the fiber optic ribbon extends parallel to the backplane board plane, so as to implement an interconnection circuit with minimum overall dimensions.

However, this document does not completely deal with the technical problem of implementing a complete interconnection system that has reduced overall dimensions and with an easy maintenance in the case of failures in an optical fiber, and it does not teach how to implement a complete interconnection circuit while developing a plurality of fiber optic ribbons on a backplane board to ensure the mutual interconnection of an ordered arrangement of connectors suitable to receive a plurality of switching boards.

SUMMARY OF THE INVENTION

The present invention aims to provide a satisfactory solution to the problems set forth above, while avoiding the prior art drawbacks.

Particularly, the invention aims to provide an optical interconnection system between signal switching boards, that may be associated with a common backplane board, that is easy to manufacture, easy to be accessed, and that allows reducing the manufacturing and possible maintenance times and costs.

A further object of the invention is to provide an optical interconnection system having reduced overall dimensions, avoiding deformations of the optical conductors that may damage conductors and signal power losses.

Still another object of the invention is to provide an optical interconnection system that allows, achieving a high number of interconnections by simple operations that may be automated.

Finally, another object of the invention is to provide an optical interconnection system by assembling fiber optic cables or similar commercial arrangements of aggregated optical fibers on backplanes without the need for auxiliary interconnection elements.

According to the present invention, such objects are achieved by virtue of an optical interconnection assembly having the characteristics set forth in claim 1.

Particular embodiments are the subject of the dependent claims, the content of which is to be meant as an integral part of the present description.

An assembling procedure of such an interconnection assembly, and an optical interconnection system between a plurality of signal switching circuit boards, as claimed, are further subjects of the invention.

In brief, the present invention is based on the principle of making optical interconnections between switching boards that are mounted on a common planar support, such as a backplane board carrying a matrix of connectors with orthogonal ranks (n×m) for assembling a plurality of switching boards in parallel, by means of fiber optic cables, for example, having a circular cross-section, and preferably of planar arrangements of aggregated optical fibers (ribbons), arranged on a support frame, along corresponding interconnection paths with a controlled deformation of the cable, without separating the optical fibers of each cable.

According to the invention, an interconnection assembly comprises a interconnection circuit extending on the support frame on a plane preferably parallel, to the limit coincident with, the side of the backplane board (herein below also referred to as the rear side) opposite the connection side with the switching boards, which comprises interconnection paths between different pairs of connectors of a rank of connectors of said matrix, orthogonal to said switching boards, made by a plurality of cables, preferably in the form of ribbons, laid on a single plane according to trajectories that are nested or contiguous, but in any case free from intersections.

The support frame carrying the interconnection circuit is intended to house connectors at the ends of the fiber optic cables in a plurality of seats that follow the arrangement of the connectors on the backplane board, and it may be removably associated with the backplane board, for example, snap engageable, or by means of screws or similar removable connection means. In such a manner, it is possible to ensure a coupling of the ends of the fiber optic cables with one of a plurality of parallel connector arrays of the matrix of connectors with orthogonal ranks, each of which is suitable to receive a corresponding signal switching circuit board.

The connectors of the fiber optic ribbons have a case within which an end portion of the fiber optic cable is housed, preferably crimped with a fiber alignment ferrule of standard dimensions, suitable for the connection with the switching boards mounted on the backplane board. The case of the connectors is preferably obtained by means of a pair of half-shells that may be firmly coupled to each other, adapted to constrain the fiber optic cable so as to form a preset curvature of the cable relative to its connection arrangement to the boards, promoting its development on the support frame.

Particularly, according to a preferred embodiment, the fiber optic cables, crimped and associated with corresponding connectors, are mounted on the frame according to a preset interconnection scheme, advantageously, an interconnection scheme computed by an algorithm for calculating an optimal topology, the corresponding path between the connector seats on the frame being guided by deflecting formations or similar curvature guide surfaces ensuring a deformation by curvature of the cable always on the same plane within preset limits of curvature radius so as to avoid damaging the fibers or trajectories anyhow critical for the optical transmission of the signals.

Due to the different length of the paths between connectors, the interconnection circuit is built from a set of cables of pre-crimped fibers (with a ferrule) having a preset and different length, depending on the positions of the connectors on the frame, which is as a function of the interconnection design (scheme).

Advantageously, this assembling system for the connection circuits, based on a support frame and connectors that may be coupled thereto, allows developing the connection circuits in a reduced space, thus decreasing the overall dimensions compared to the prior art solutions, while leaving the optical fibers unchanged and making the maintenance operations simpler. Particularly, it is possible to drastically reduce the maintenance costs of a backplane interconnection system by removing and optionally replacing a single interconnection circuit on a single support frame, relative to a single rank of connectors.

Furthermore, the solution that is the subject of the present invention has the advantage of allowing a more efficient manufacturing process, since the assembling of the interconnection circuits to the backplane board occurs by connection ranks (n connectors at the same time) and not for each single connector anymore, in shorter times.

Furthermore, it is possible to provide modular backplane boards, i.e., with n rows and m columns of connectors, where n and m are variable, and to adapt the interconnection system that is the subject of the invention to a backplane board having any dimension (even not squared).

The arrangement of standardized connectors in combination with each support frame of an interconnection assembly reduces the assembling times in an ICT apparatus. The use of commercial optical fibers, available in the form of ribbon cables according to the desired number of conductors, and the fact that the fibers end with standardized ferrules, compatible with the technology that is the subject of the invention, makes it possible to reduce the assembling costs for the interconnection assemblies according to the present invention, without the need for a specific machining.

Finally, it is possible to suitably implement a support frame that is closed outwardly, so as to increase the frame rigidity, as well as the IP protection degree of a switching apparatus; thus, ultimately, the circuit reliability.

BRIEF DESCRIPTION OF THE DRAWINGS

Further characteristics and advantages of the invention will be set for in more detail in the following detailed description of an embodiment thereof, given by way of non-limiting example, with reference to the appended drawings, in which.

DETAILED DESCRIPTION

An exemplary embodiment of an optical interconnection system between boards of a high capacity ICT apparatus according to the invention is described below, based on the use of fiber optic ribbon cables for implementing a preset interconnection circuit, which are housed in one or more support frames and provided with connectors at the ends thereof, for the coupling in connection seats of a common planar support, or backplane board, carrying on a side a connection matrix with orthogonal ranks, including a plurality of parallel connector arrays, each of which is adapted to receive a corresponding signal switching circuit board.

Figure 4:
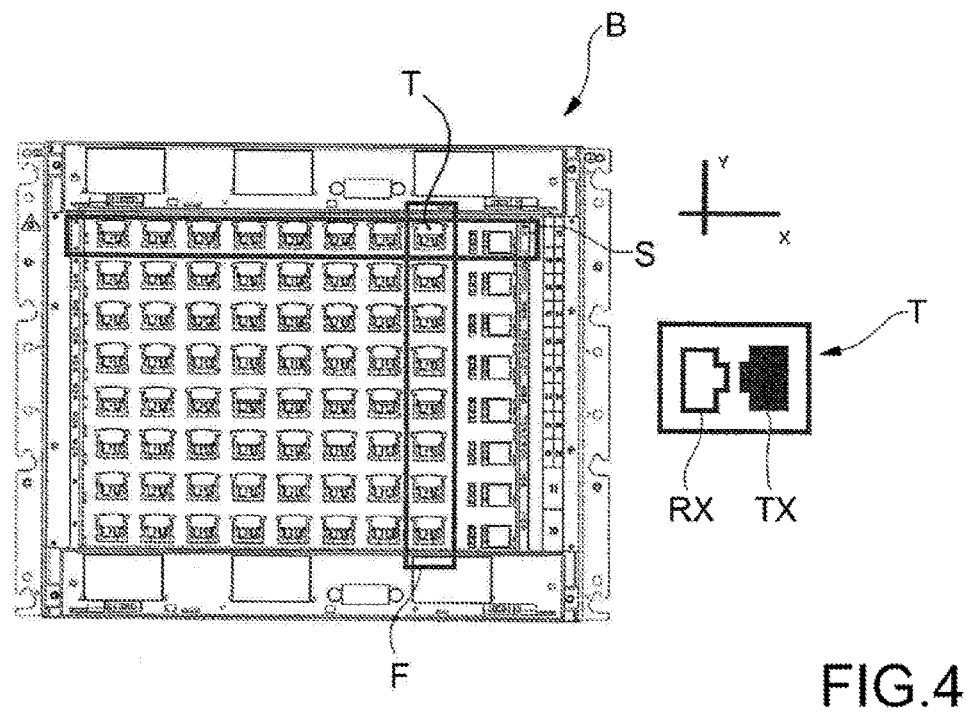
FIG. 4 is a plan view, on the boards side, of an interconnection system for switching boards in a telephone switching center, in which a rank of connectors intended to receive a switching board, a rank of connectors with which an interconnection circuit according to the invention can be associated, and a connector seat, including a first connector intended to face a signal transmission port of said boards and a second connector intended to face a signal reception port of said boards are shown.

With reference to FIG. 4, a common planar support board, or backplane, B of an interconnection system according to the invention is shown, for example, an interconnection system for switching boards provided for in a cabinet of a telephone switching center, in a plan view on the boards side, i.e., on the side where an operator operates in the center to access a plurality of switching boards (not shown). The backplane board B has a connection matrix with orthogonal ranks n×n, including a plurality of parallel arrays of connector units T pre-assembled for the mechanical connection (stable assembling) and optical connection (signal transmission) of n boards, each of which is adapted to be mounted orthogonal to the plane of the backplane board, on n connector units arranged in ranks aligned in rows or columns of the connection matrix n×n. In the figure, in a box S, a rank of connector units (aligned in rows, in this example) is shown, which connector units are intended to receive one of eight switching boards available on eight parallel horizontal planes, and in a box F, a rank of connector units (aligned in columns, in this example) is shown, with which an interconnection circuit according to the invention can be associated. A connector unit is further schematically shown in the figure, including a first connector TX arranged to face a signal transmission port of said boards, and a second connector RX arranged to face a signal reception port of said switching boards.

The backplane board B has opposite sides, respectively a board side (shown in the figure), for assembling the switching boards of an apparatus, and a connection side (not shown), adapted to receive the optical interconnection circuits between the assembled switching boards. Particularly, the backplane board is adapted to receive, on the opposite side, not shown in this figure, a plurality of n optical interconnection circuits between the switching boards, each of which is mounted on an optical interconnection assembly which is associated with the common backplane board, parallel thereto and orthogonal to the connector arrays adapted to receive the switching boards.

In the exemplary embodiment, the interconnection system is arranged to receive n=8 switching boards arranged in rows, therefore as many interconnection circuits will be present on corresponding support frames, arranged in columns. Each frame/circuit of the i-th row implements a special connection scheme or circuit, which is preset by a calculation algorithm. The development of all the n interconnection circuits is referred to as "routing".

In order to implement the connections, each optical interconnection assembly comprises an interconnection circuit including a plurality of optical fiber arrangements adapted to connect a corresponding first connector TX with a corresponding second connector RX, according to the preset interconnection scheme.

Figure 1:
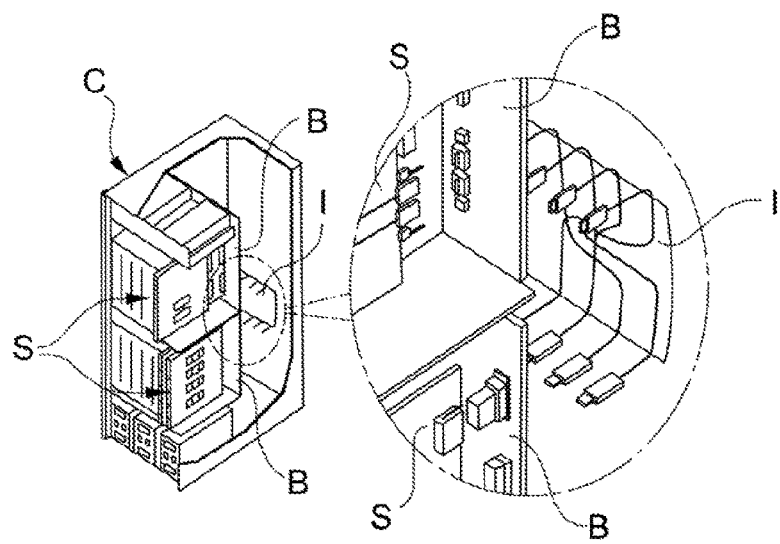
FIGS. 1-3 are schematic representations of a switching center, of an optical interconnection circuit and of a fiber optic ribbon planar arrangement, known in the art.
Figure 2:
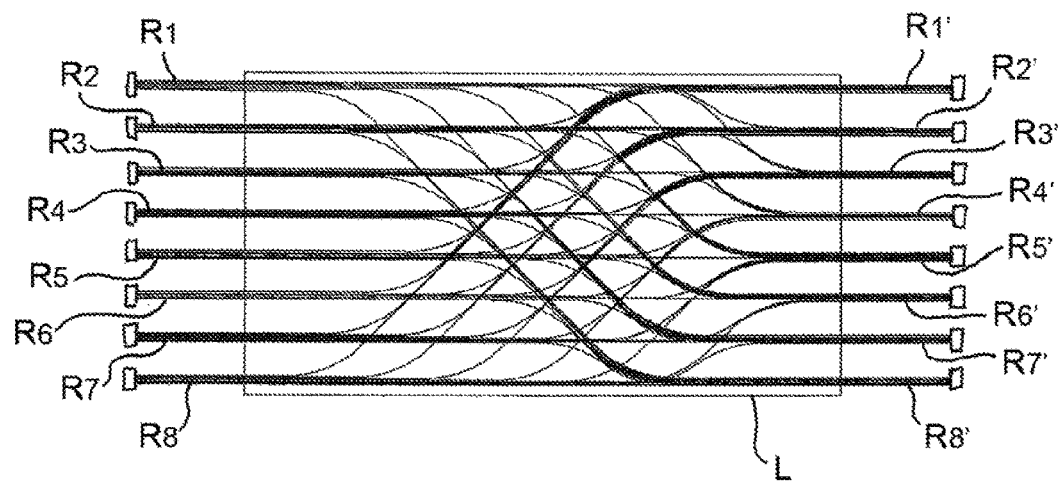
Figure 3:
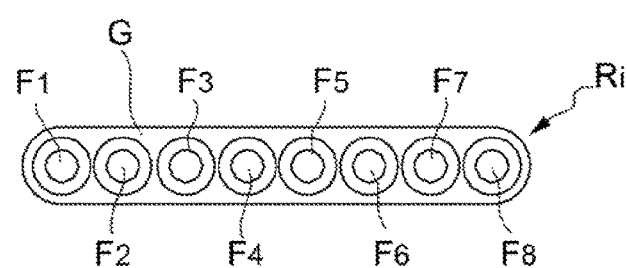

The invention relates to devising and developing a particularly efficient optical interconnection circuit, in which the optical connection between each pair of connectors TX, RX is carried out through a bundle of optical waveguides, such as a planar optical fiber arrangement, preferably a commercial flexible ribbon cable, of the type shown in FIG. 3, which comprises a preset number of parallel multimode optical fibers, necessary to ensure the transmission capacity of the apparatus.

Figure 5:
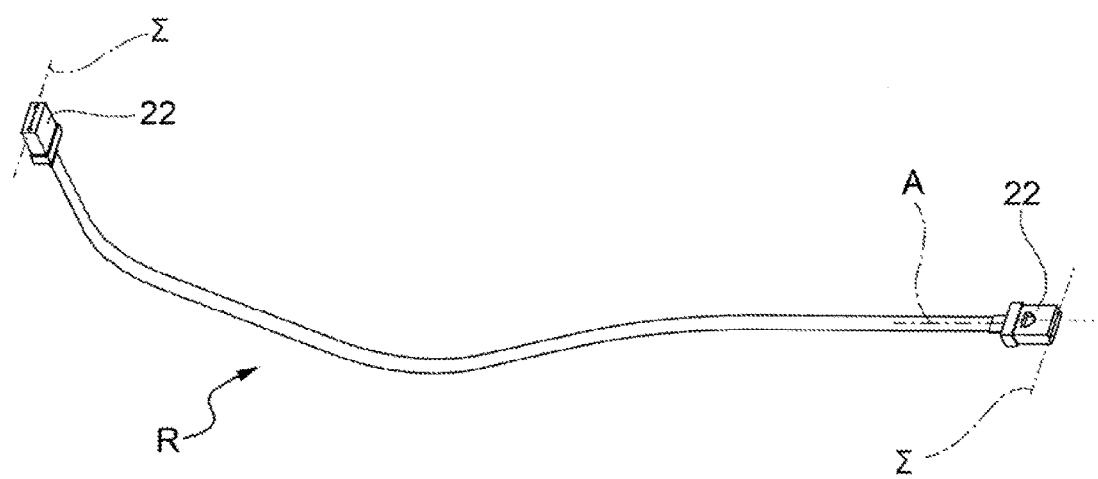
FIG. 5 shows a planar fiber optic arrangement (a fiber optic ribbon cable) with terminal crimps.
Figure 6:
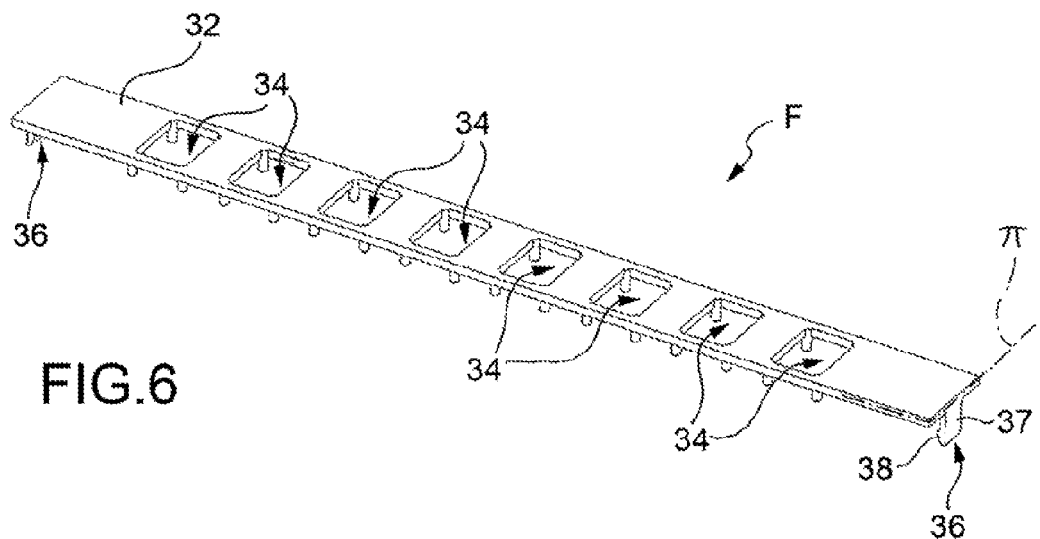
FIGS. 6-9 are representations of a planar support frame according to the invention.
Figure 7:
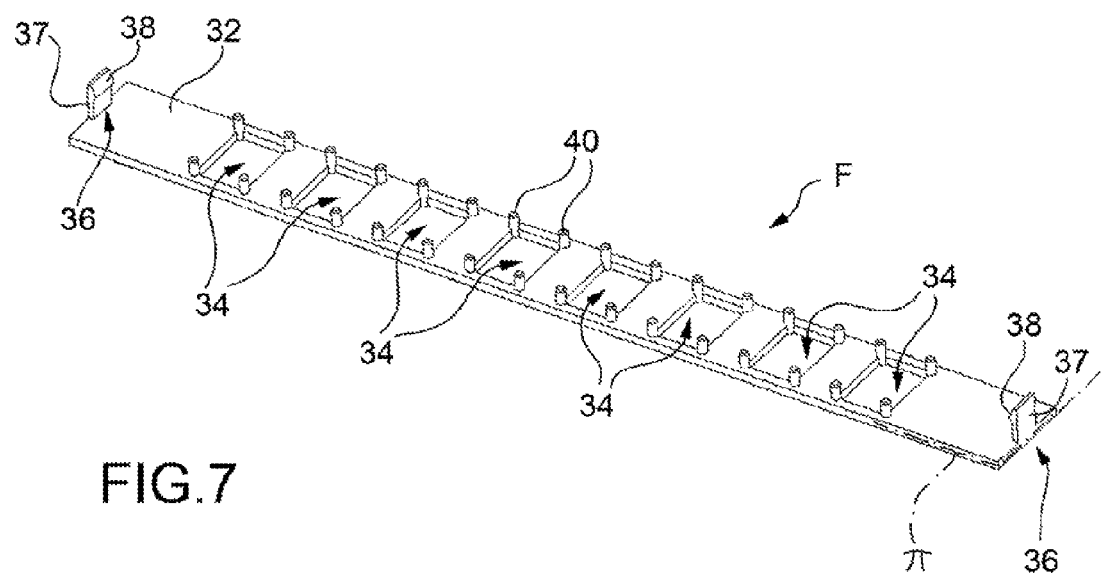
Figure 8:
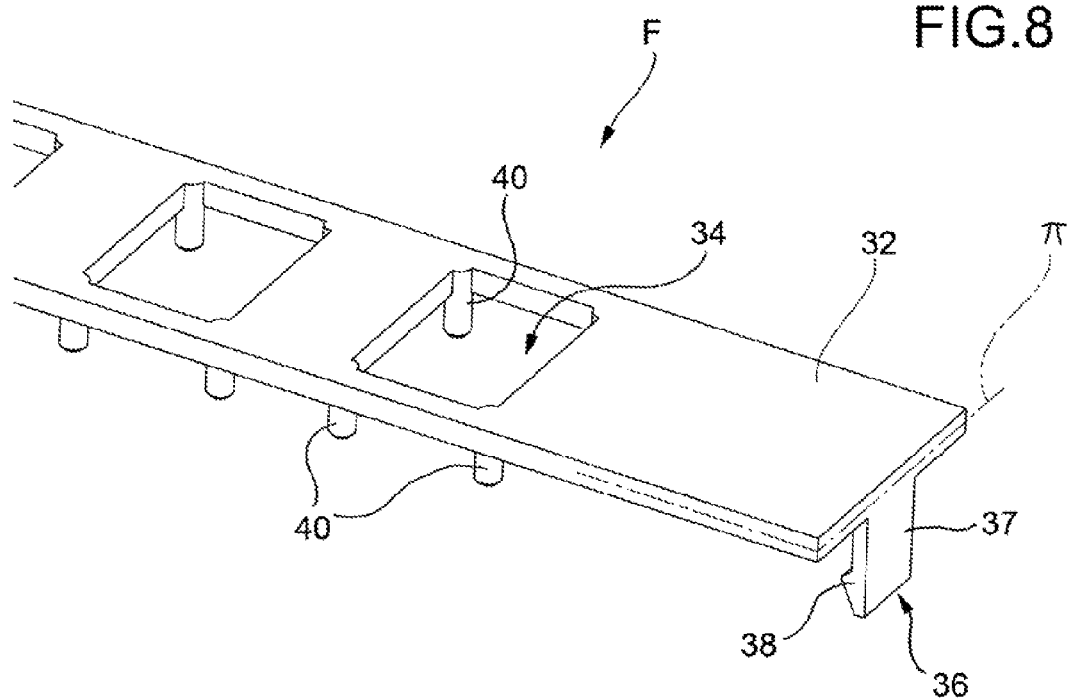
Figure 9:
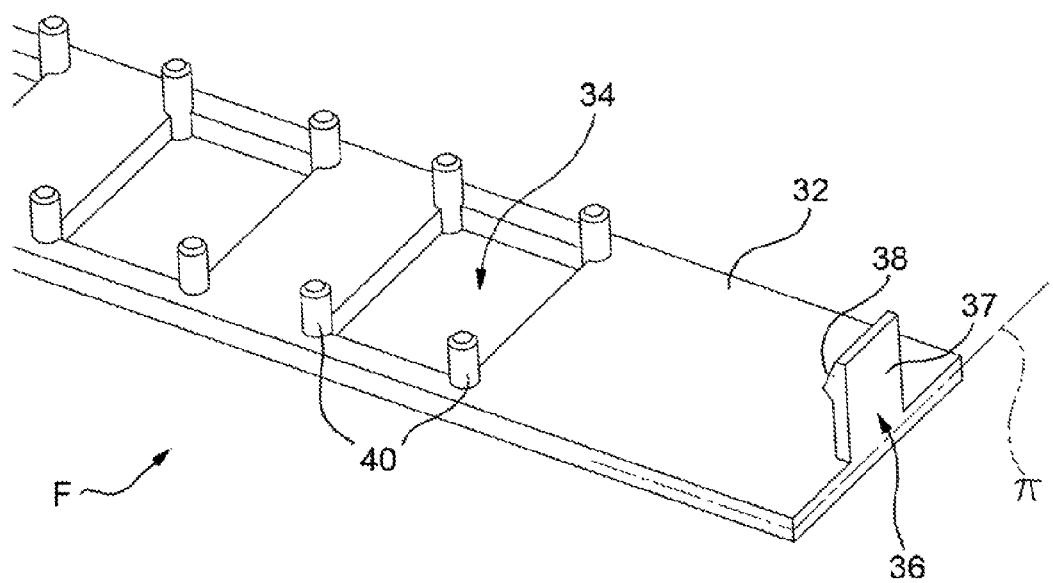

A ribbon cable (or, simply, ribbon) R of optical fibers is shown in FIG. 5. It extends on a surface $\Sigma$ along a longitudinal axis A and, by virtue of its planar configuration, it has a good folding capability in the thickness direction, i.e., about an axis parallel to the laying surface $\Sigma$, particularly an axis that is transversal to the axis A, but a worse folding capability on the laying surface $\Sigma$. The ribbon R has its ends crimped with end elements, or ferrules 22 having an approximately rectangular cross-section, typically in a plastic material, acting to arrange the fibers according to a standardized alignment geometry necessary for the connection and to give suitable mechanical rigidity properties to the ribbon end.

In FIGS. 6-9, a planar support frame F is shown, which is adapted to guide the deployment of an interconnection circuit between corresponding pairs of first and second connectors TX, RX according to a preset interconnection scheme.

The frame F includes a structural element 32 in the shape of a substantially rectangular planar plate, having a sufficient length to encompass a complete range of n connectors of as many boards, and a width corresponding to the dimensions of a range of connector units T. On the plate, a plurality of aligned connector seats 34 is obtained, in the exemplary case, a number n of connector seats, including corresponding openings for housing and holding connector units, so shaped as to geometrically correspond to the connection seats of the backplane board. The above-mentioned openings form seats for a first and a second connector, respectively for the reception and transmission of an optical signal, having the same shape, as described in detail herein below.

The support frame F further includes snap coupling means 36 of the frame to the common backplane board B, for example in the form of flexible tabs 37, which extend orthogonally to the plate 32 and which are provided, at the free end thereof, with a tooth or a similar hooking formation 38.

At the vertexes of the openings of the connector seats 34, corresponding deflecting formations are defined, preferably having a curved surface, still more preferably having a cylindrical or at least partially cylindrical shape, which define, on at least a portion of their side surface, corresponding controlled deformation guide means for the optical fiber arrangements of an interconnection circuit, in the form of curvature guide surfaces for at least one fiber optic ribbon R the laying plane Σ of which is orthogonal to the plate 32, i.e., generally, to the frame plane, indicated in the figure with Π. In the embodiment shown in the figures, such deflecting formations are cylindrical pins 40 projecting from the frame plane.

Figure 10:
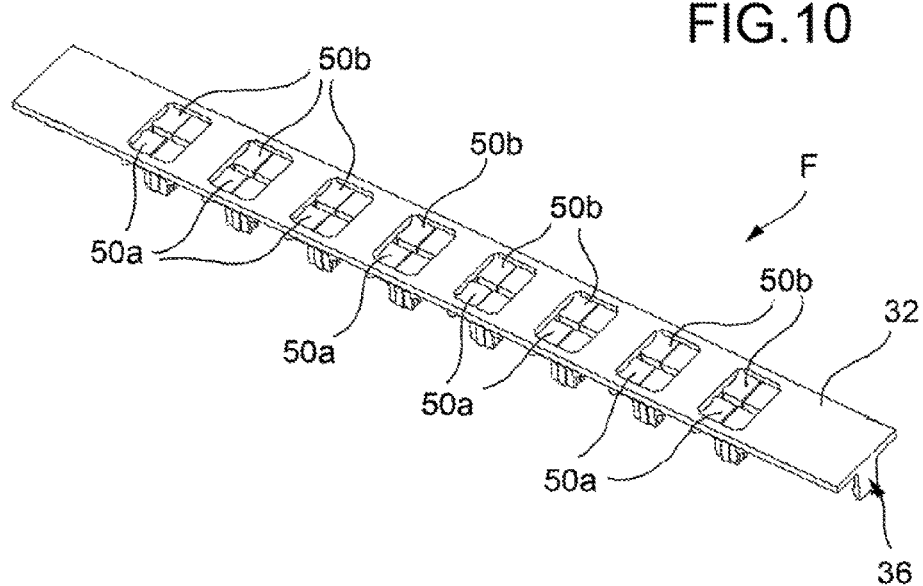
FIGS. 10-12 are representations of the planar support frame with an assembled connection circuit.
Figure 11:
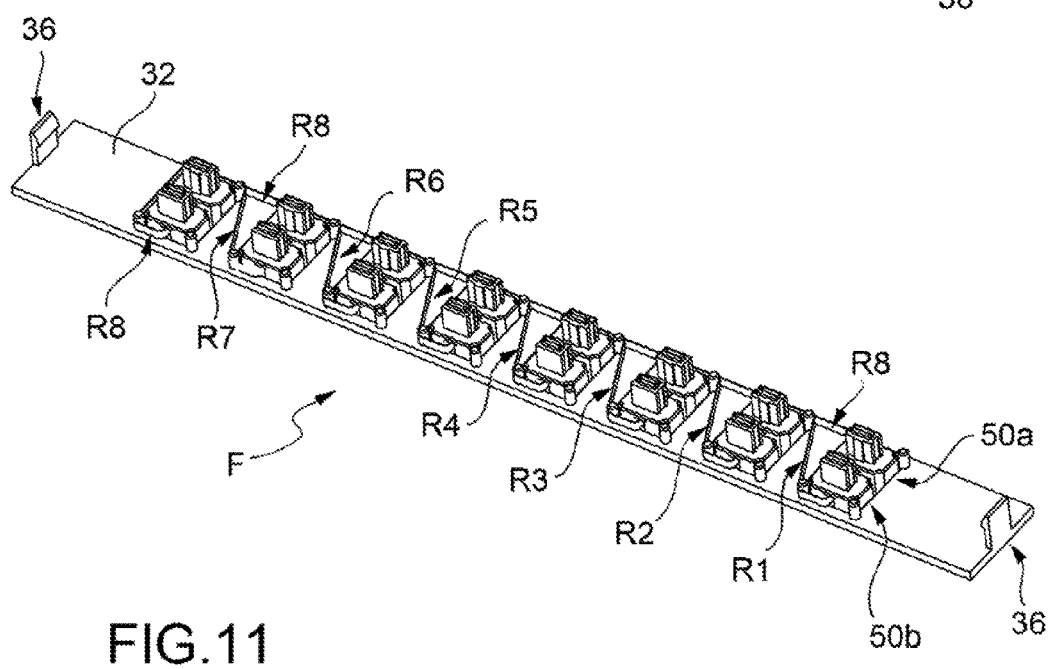
Figure 12:
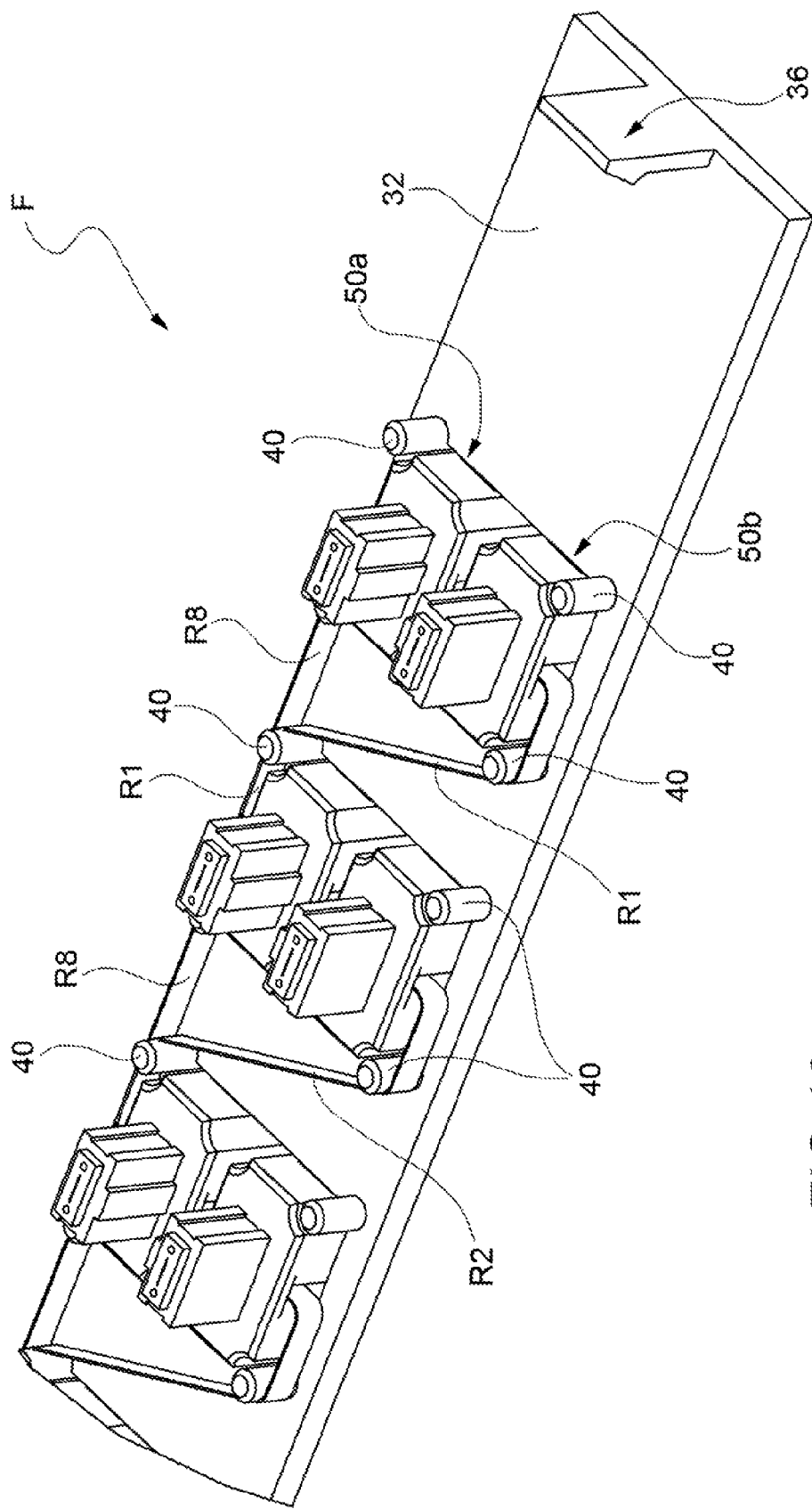

FIGS. 10-12 are representations of the planar support frame with an assembled connection circuit. Particularly, each seat of connectors 34 is occupied by a pair of connector units 50a, 50b, respectively a first transmission connector TX 50a and a second reception connector RX 50b. It shall be noticed that, although in the preferred embodiment described herein, all the first connectors TX and all the second connectors RX are housed in the seats 34 in an ordered manner, according to an aligned arrangement, it is also possible that they are arranged offset or intercalated, provided that they meet the condition that a first transmission connector TX and a second reception connector RX are housed in each seat 34.

In an alternative embodiment, the deflecting formations of the optical fiber arrangements of the interconnection circuit are built integral to the connectors, for example, consisting in shaped edges of the bodies of the same connectors.

According to the invention, the fiber optic ribbons that form an optical interconnection circuit extend, in the path between a corresponding first connector TX 50a and a corresponding second connector RX 50b, with their own laying surface Σ orthogonal to the frame plane Π, and with the longitudinal axis A parallel to the frame plane Π, according to a trajectory that has a curvature around folding axes of the ribbons directed perpendicular to the plane Π, and having a variable curvature angle, preferably, but not exclusively, ranging between 30 and 90 degrees (between 30 and 45 degrees for folds towards diagonal path lengths, 90 degrees for folds towards perpendicular path lengths) and a curvature radius higher than a preset threshold value, in order to avoid damaging the structure of the ribbons of the fibers they contain, or electromagnetic losses. Such ribbon curvatures are possible by exploiting its intrinsic characteristic to have a low flexural rigidity along a transversal axis, this considerably promoting its deposition and the direction changes that are necessary to reach, from a corresponding first connector, the corresponding second connector. On the other hand, the flexural rigidity of the ribbon about an axis orthogonal to its laying plane Σ is very high, and this makes the ribbon not orientable on the laying plane.

The diameter value of the cylindrical pins 40 defines the minimum value of the folding radius obtained by the ribbon, and it represents a first geometrical configuration parameter for the system. Suitably, it is selected based on optical tests and on the transmission losses due to the folding. Transmission loss values are known in the literature (expressed in dBs) due to a fold of an optical fiber, as a function of the folding radius value. As a function of the physical and optical characteristics of the optical fibers, it is possible to select a suitable value for the diameter of the deflection pins 40 so as not to cause excessive optical transmission losses.

FIG. 11 and FIG. 12, which represents an enlarged portion thereof, show an example of an interconnection circuit having a particularly simple topology, comprising a plurality of fiber optic ribbons, in this exemplary case, eight ribbons indicated with the references R1-R8, each of which connects a first connector TX 50a of a seat with the second connector 50b of the adjacent seat, except for the last connector TX 50a in the array, which is connected to the first connector RX 50b in the array.

Generally, each ribbon undergoes a folding immediately after it has come out from a first connector 50a, orienting itself to the direction of the second connector 50b to be reached. Since two connectors are present, the ribbon will undergo at least 2 folds. Furthermore, all the ribbons undergo at least two transversal folds, and this is due to the mutual arrangement of the first and second connectors 50a, 50b on parallel rows.

As it may be noticed, the interconnection circuit runs according to a preset interconnection scheme, establishing a plurality of nested or contiguous paths of the fiber optic ribbons R1-R8, and in any case free from intersections. The paths emerging from a first connector 50a have curvatures coming out from the connectors, substantially rectilinear intermediate segments, and possible direction changing intermediate sections according to controlled curvatures about deflecting elements 40 on the frame F, to reach a second connector 50b in the proximity of which they have an access curvature. The cylindrical formations 40 form deflecting means of the ribbons R1-R8 with a controlled deformation (fold), i.e., their side surface has a curvature radius higher than a preset threshold value in order to avoid damaging the structure of the ribbons, of the fibers they contain, or signal losses. In those trajectory lengths in which a plurality of ribbons extends in a nested condition, the ribbons are arranged facing, on parallel planes, as in the case of ribbons R1 and R8, as well as R2 and R8, in the example of FIG. 12.

Different interconnection schemes are possible. In the routing configuration, circuits that are easy to implement may be present, as in the case of loopback connections in which each transmission connector is connected to the reception connector of the same seat, but also cases having particularly tortuous ribbon paths.

Figure 13:
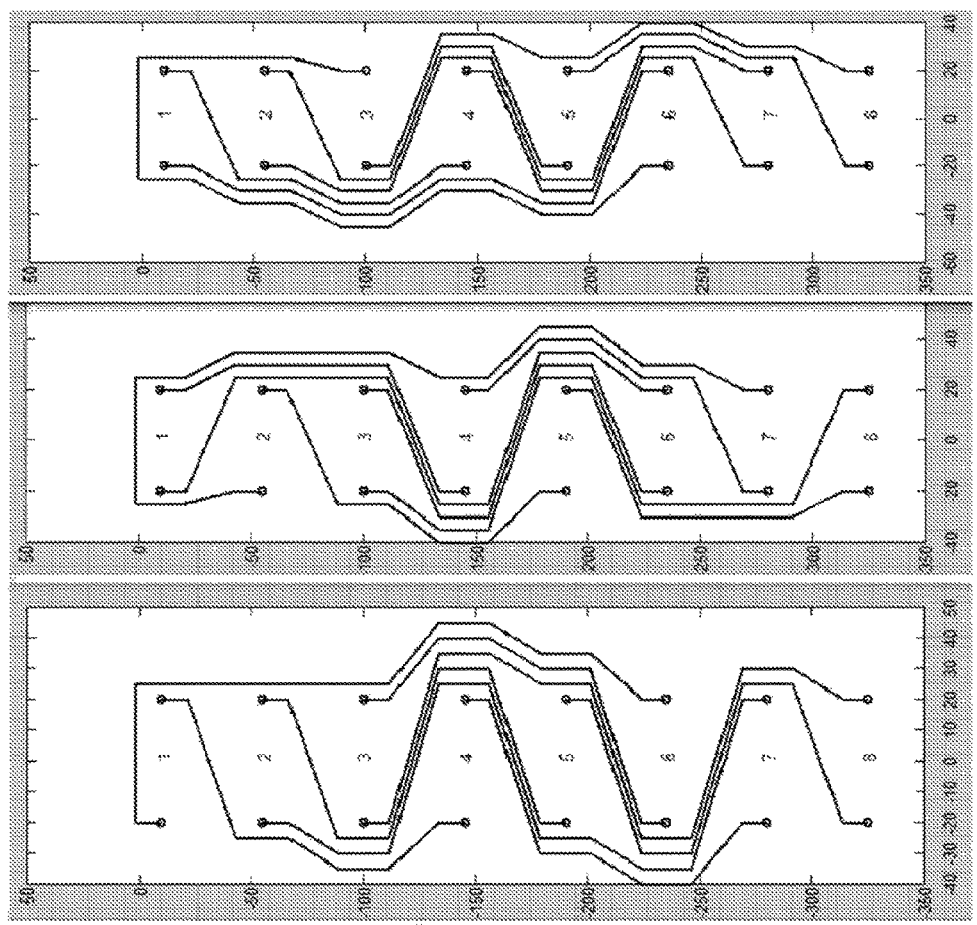
FIG. 13 shows alternative interconnection schemes.

In order better to elucidate how complex the development of the path created by the ribbons on the frame may be, FIG. 13 shows different equivalent solutions for a same interconnection scheme. A calculation algorithm could optimize the functional parameters of the system, i.e., the number of curves (deformations) which each ribbon undergoes, and/or the ribbon length. From the simulation result of FIG. 13, it is possible, for example, to determine the number of curvatures (controlled deformations) that the single ribbons will have to carry out in their own path between the corresponding first and second connectors, as well as the length of each ribbon, for each alternative variant. The selection between alternative variants of the routing circuit is preferably carried out by using an algorithm for the optimization of preset parameters, such as, for example, minimizing the curvature sections, or minimizing the number of ribbons having a different length, this particularly affecting the control of warehouse costs.

Figure 14:
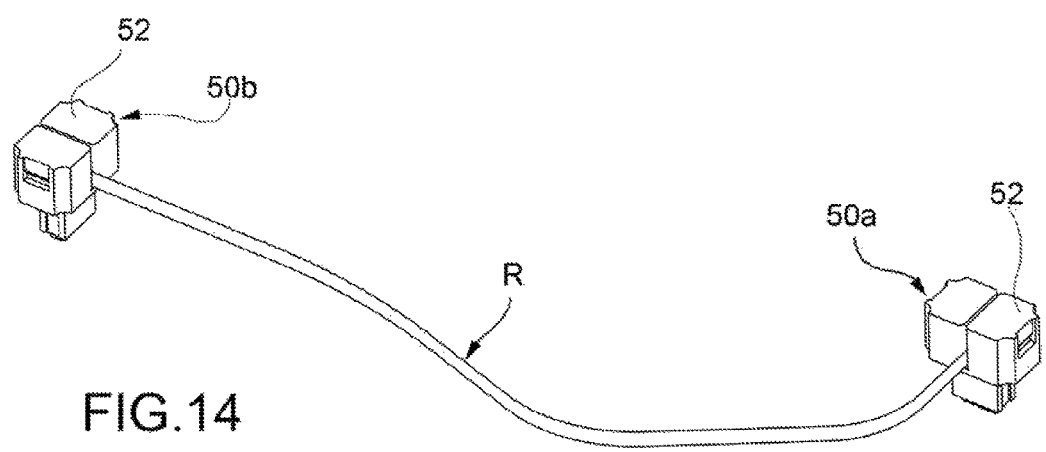
FIGS. 14-16 show a planar optical fiber arrangement with the end portions thereof housed in a connector case.
Figure 15:
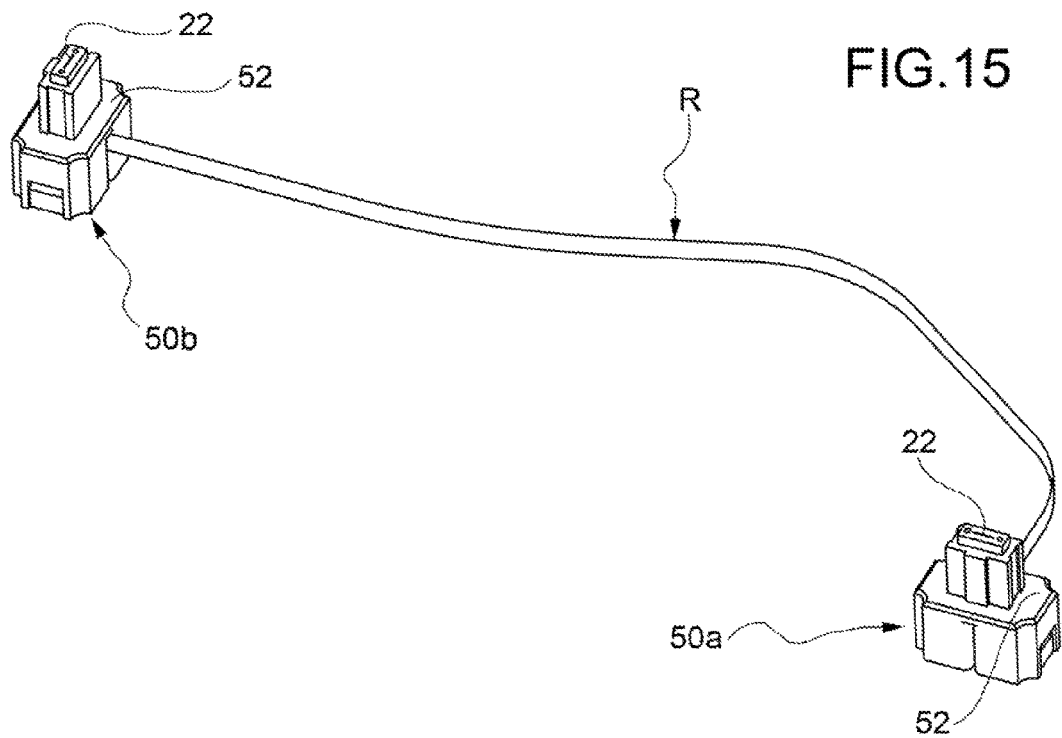
Figure 16:
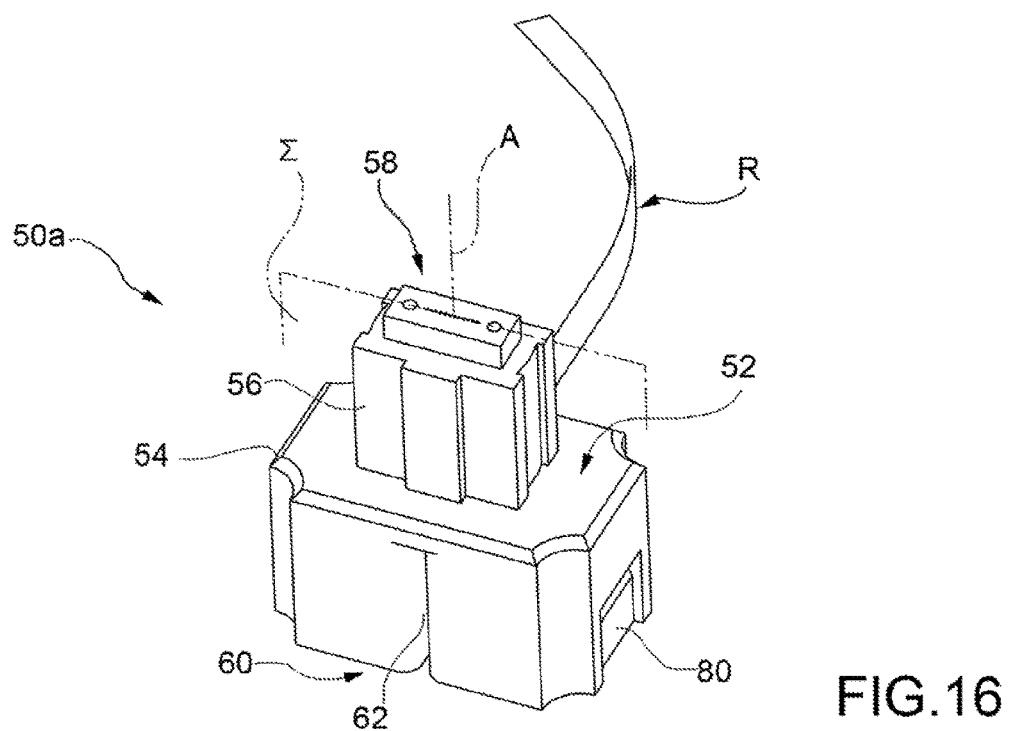
Figure 17:
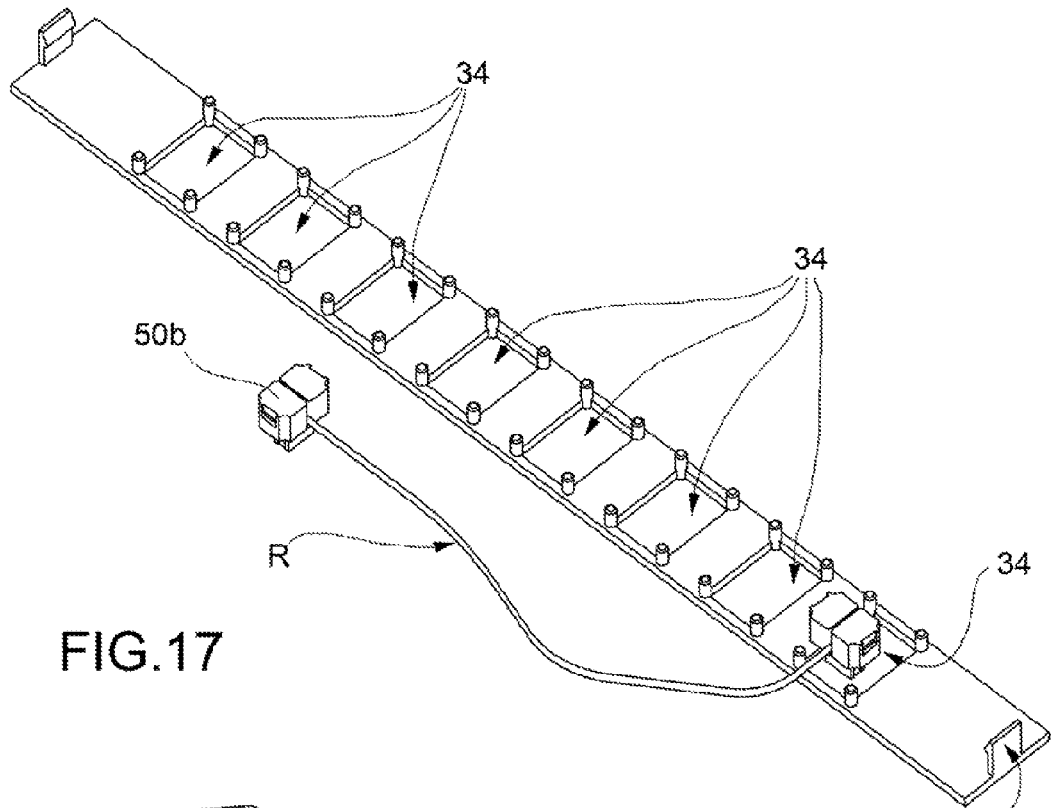
FIGS. 17, 18 show the coupling of an optical fiber arrangement of the interconnection circuit to the support frame.
Figure 18:
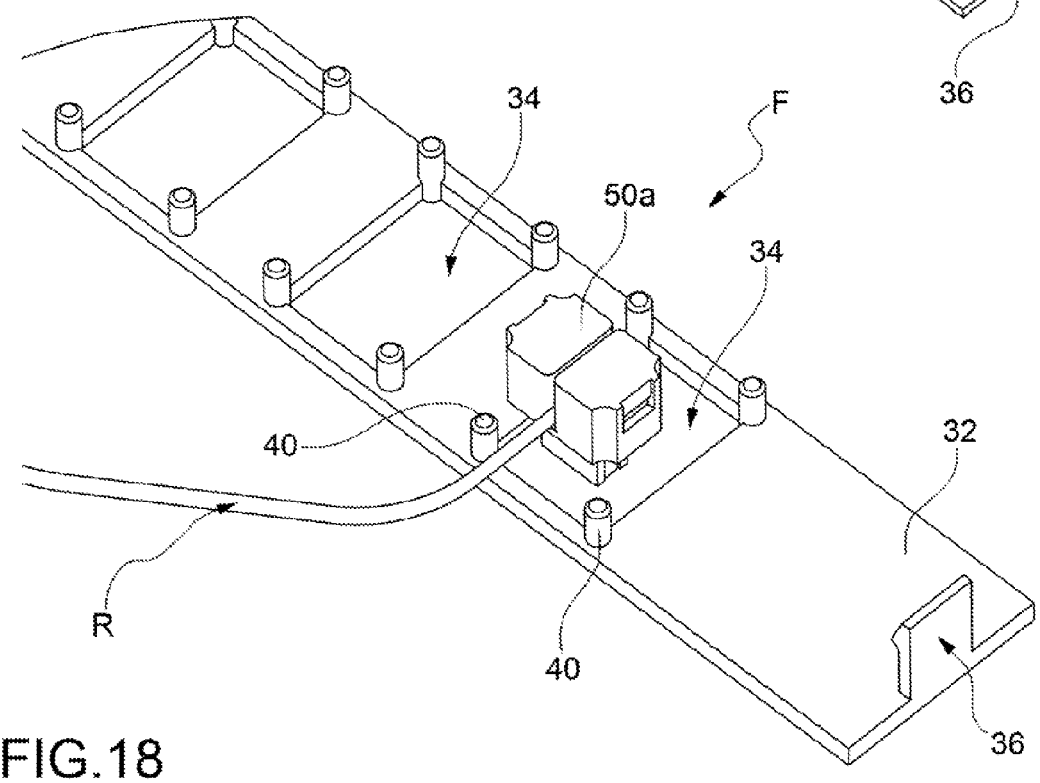
Figure 19:
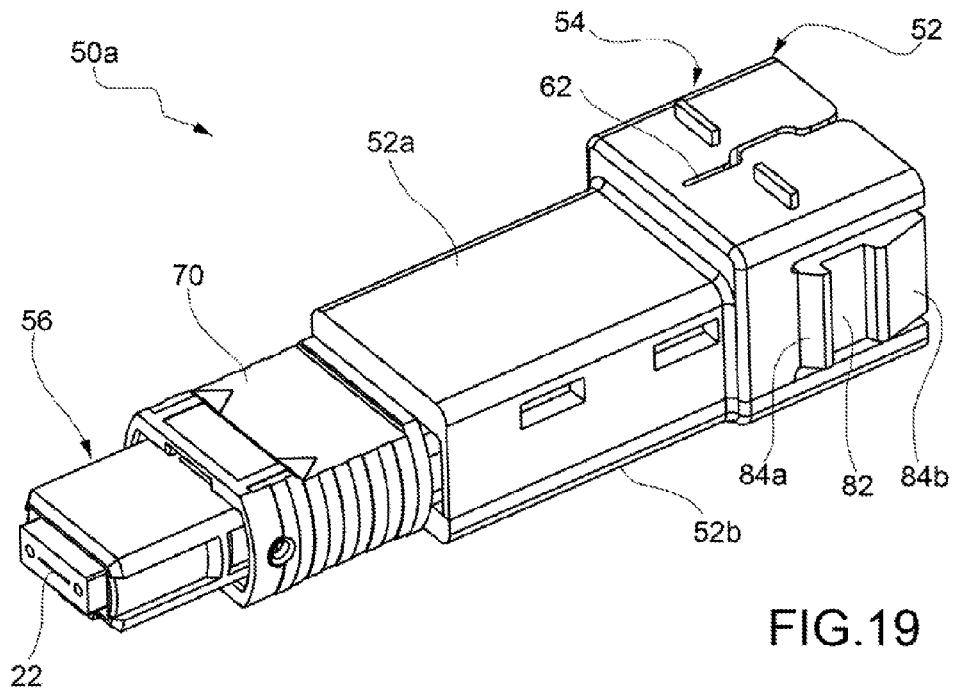
FIGS. 19-22 show a preferred embodiment of a connector of the optical fiber arrangement, in an assembled and exploded condition, in which the controlled deformation of the arrangement of fibers is illustrated.
Figure 20:
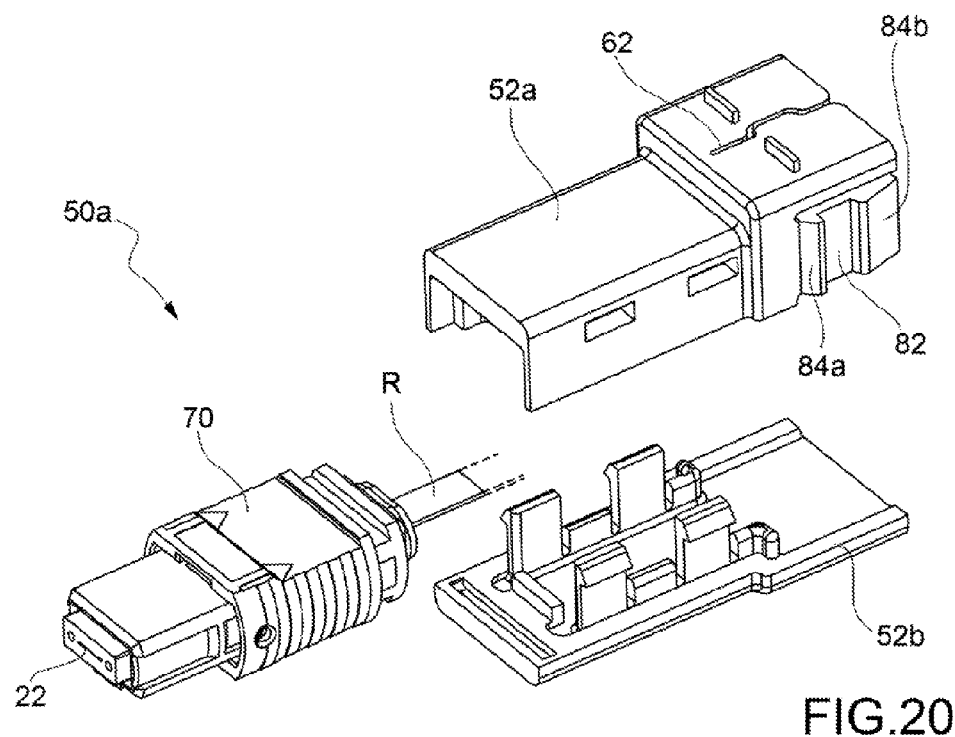

FIGS. 14 and 15 show a fiber optic ribbon R with end portions housed in a corresponding connector case 52, from which the end element or ferrule 22 of the ribbon emerges. The connector case 52 has a main body 54 for coupling to the frame F, and an end portion 56 for coupling to the board connector. As it is best seen in FIG. 16, and in FIGS. 17, 18 which show the coupling of a fiber optic ribbon of the interconnection circuit to the support frame, each connector case 52 is adapted to house an end element, or ferrule 22, of the corresponding fiber optic ribbon, so as to have the end element at an output section 58 of the optical fiber arrangement, facing the switching boards with the longitudinal axis A of the fiber optic ribbon orthogonal to the frame plane. At an input section 60 of the optical fiber arrangement, the connector case 52 has a slit 62 allowing fiber optic ribbon to pass and to be hold in a plane orthogonal to the frame plane, i.e., according to such an arrangement as to have its own development surface orthogonal to the frame plane Π.

The connector case 52 of each connector 50a, 50b builds therein a controlled deformation of the corresponding fiber optic ribbon so as to change its spatial arrangement relative to the frame plane Π, particularly from the input section 60, in which the ribbon lays on a surface orthogonal to the plane Π, at the output section 58, in which the ribbon lays with the longitudinal axis orthogonal to the plane Π.

More precisely, the connector case has guide means of a fiber optic ribbon with controlled deformation, i.e., the development of which is known and repeatable, which comprise formations adapted to determine a combination of a torsion of the fiber optic ribbon about its own longitudinal axis A and a curvature of said ribbon around a transversal axis, without any limitation in their succession. Still more particularly, within each connector case the fiber optic ribbon undergoes, starting from the end crimped with a ferrule, a folding of 90° around a transversal axis, therefore a torsion of 90° to reach the output section 58.

The connectors shown in the FIGS. 14-18 have an integral connector case, i.e., formed as a single piece, receiving a ribbon crimped with a ferrule MT, without any reference pin and other standardization elements, whereby the mechanical interface with the connection seats of the backplane board is to be meant as a dedicated one, i.e., non-standardized. The technical analyses on the board connectors typically mounted on a backplane raised the need to have mechanical interfaces with a standardized type of backplane connection seats, i.e., reproducing the standard as set forth by European regulation CEI EN 61754-7:2004, "Fibre optic connector interfaces". Particularly, the type of standardized connection that is believed to be most suitable for application on a backplane is in the family of MPO connectors (Section 7 of the above-mentioned technical regulation CEI EN). The backplane connection seats have a standardized MPO receptacle (for example, of the male type, with projecting coupling pins), whereby the interconnection assembly according to the invention preferably has to be provided with MPO connectors (of the female type, with holes calibrated to house the pins) assembled to the connector case 52 with constraints so designed as to allow an optimal coupling with the MPO dual connector incorporated in the board connector.

FIGS. 19-22 show a currently preferred embodiment of the connector units 50a, 50b with standardized optical-mechanical interfaces, i.e., designed to house and bind, according to preset specifications, a commercial MPO connector of a backplane board.

FIGS. 19-22 show the preferred embodiment of the connector units 50a, 50b in an assembled condition, in an exploded view and in an open view, in which the controlled deformation of the fiber optic ribbon is illustrated. In FIGS. 19-22 elements or components that are identical or functionally equivalent to those illustrated in the previous figures have been indicated with the same references already used in the description.

The connector case 52 has a pair of half-shells 52a, 52b, that may be snap coupled together, and adapted to hold—in the coupled condition—the end crimped by a ferrule of a fiber optic ribbon, pre-assembled with a connector of the MPO type 70.

The connector case 52 has controlled deformation guide means, i.e., the development of which is known and repeatable, which comprise formations adapted to determine a torsion of the fiber optic ribbon around its own longitudinal axis, and a curvature of said ribbon around a transversal axis, without any limitation in the succession. More particularly, within each connector case the fiber optic ribbon undergoes, starting from the end crimped with the ferrule, a folding of 90° around a transversal axis, therefore a torsion of 90° to reach the output section.

The controlled deformation guide means of the connector case 52 particularly comprise the slit 62 at the input section 60 of the fiber optic ribbon that allows the passage and holding of the ribbon. Such slit, formed with such dimensions and thickness as to clamp the ribbon, is an orientation constraint for the ribbon coming out from the connector, and prevents the ribbon from sliding into the connector case, defining in a stable way the length of the ribbon portion between the input section and the output or crimping section of the ribbon (also representing an intrinsic constraint to the spatial position of the ribbon). Such length is predetermined so as to allow the folding and torsion deformations described before, which could suitably be further guided by curved surfaces within the case.

Suitably, the controlled deformation guide means of the connector case 52 further comprise outer wall portions of said connector case in the proximity of the passage opening of the fiber optic ribbon at the output section, adapted to form curvature guide surfaces of the fiber optic ribbon coming out from the connector unit.

Figure 21:
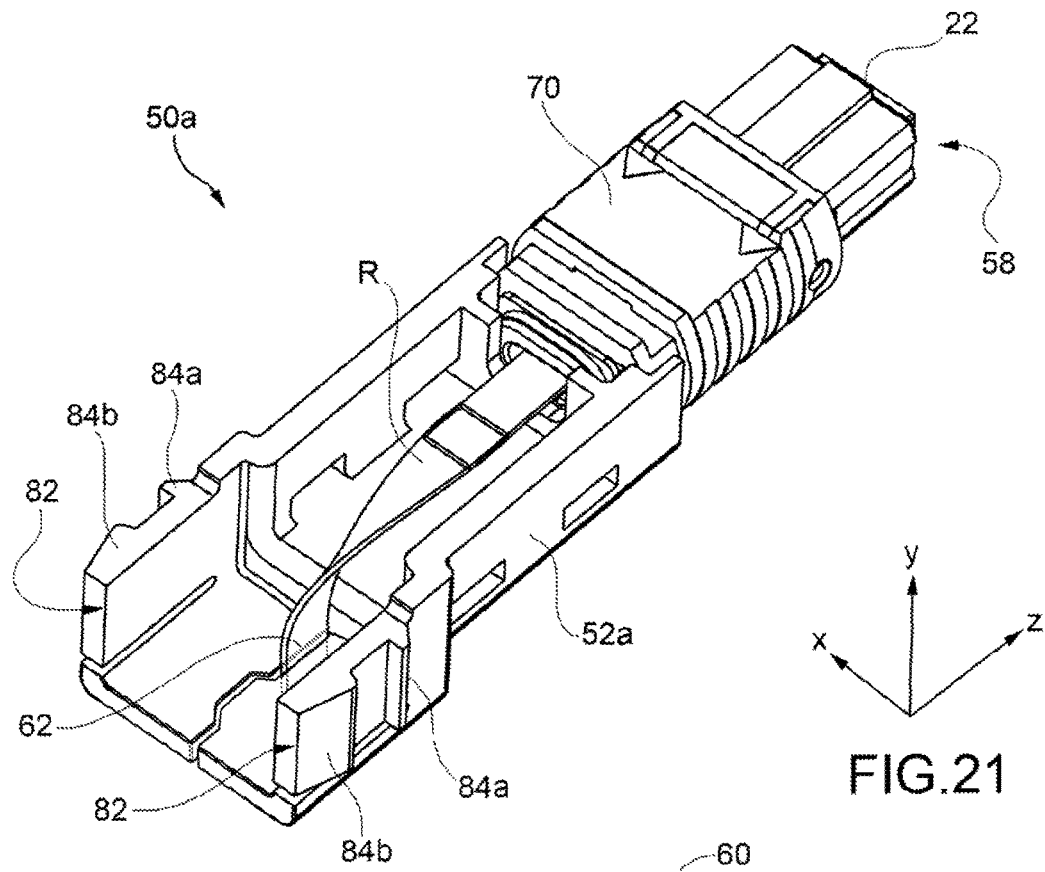
Figure 22:
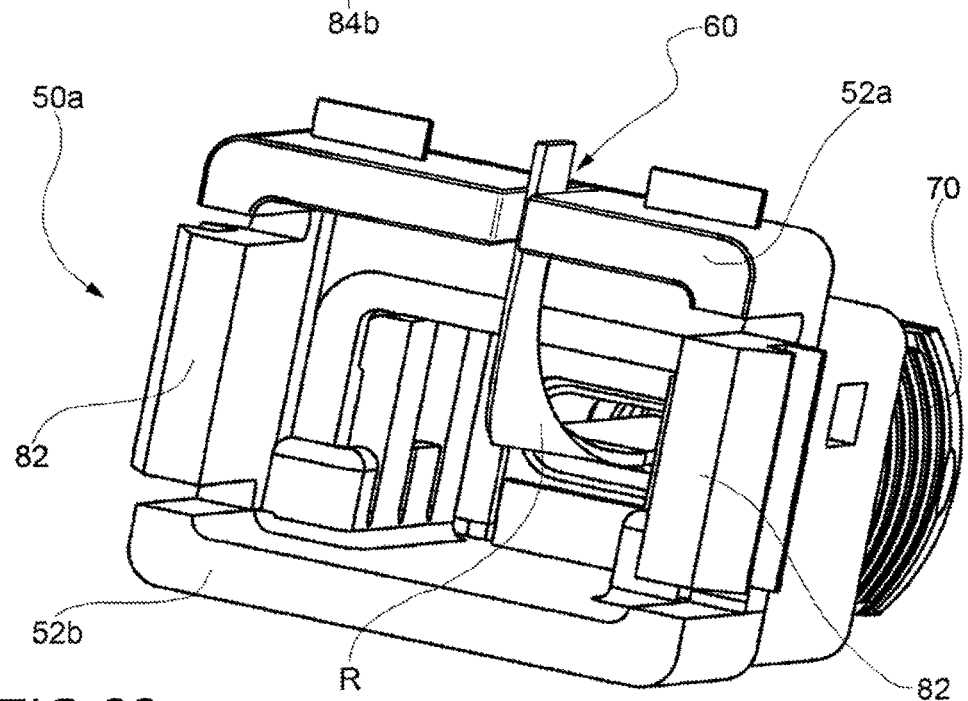

FIGS. 21, 22 show in detail the controlled deformation path of a fiber optic ribbon within a corresponding connector case.

Referring to the reference orthogonal cartesian axes as in FIG. 21, where the longitudinal axis A of the ribbon extends along the z axis, the ribbon width is defined along the x axis and the (negligible) thickness of the ribbon is defined along the y axis, and taking the right-hand screw rule for the sign of the degrees (i.e., positive clockwise rotations in the direction of the positive z), then it is possible to describe the deformation transmitted to the ribbon as +90 degrees torsion about the Z axis and a −90° fold about the X axis. It is also possible to reproduce the same deformation by inverting the two transformations. The actual surface that the ribbon takes is complex, and composed of spline curves with a variable radius.

The distance of the ribbon section to which it is secured in the slit of the connector case relative to the crimping section of the ribbon (more precisely, the input section in the MPO connector or in a crimping terminal of the ribbon) represents a second geometrical parameter for the system configuration, which allows controlling the curvature taken by the ribbon and avoiding that it is critical for an optical transmission (power losses by folding).

Through the definition of the above-mentioned geometrical configuration parameter, i.e., the length of the ribbon segment between the two fixed points between which its deformation occurs, the deformation itself can be controlled, and it is possible to avoid that it is "critical" to the application. Furthermore, by setting a value of such parameter, the deformation will be made sufficiently "repeatable", in order to implement always the same complex deformation curve (torsion and folding) in each connector 50a, 50b.

Suitably, also the value of the second geometrical configuration parameter of the system will be established, for example, by suitable optical tests. Too low values of such length cause unduly heavy ribbon deformations, with too small curvature radiuses, which could cause optical losses and excitation mode phenomena at undesired frequencies. On the other hand, too high values for this parameter have the drawback to use an excessive ribbon amount, and in some cases, the ribbon could always take an incontrollable curvature that is critical to the optical transmissions.

Figure 23:
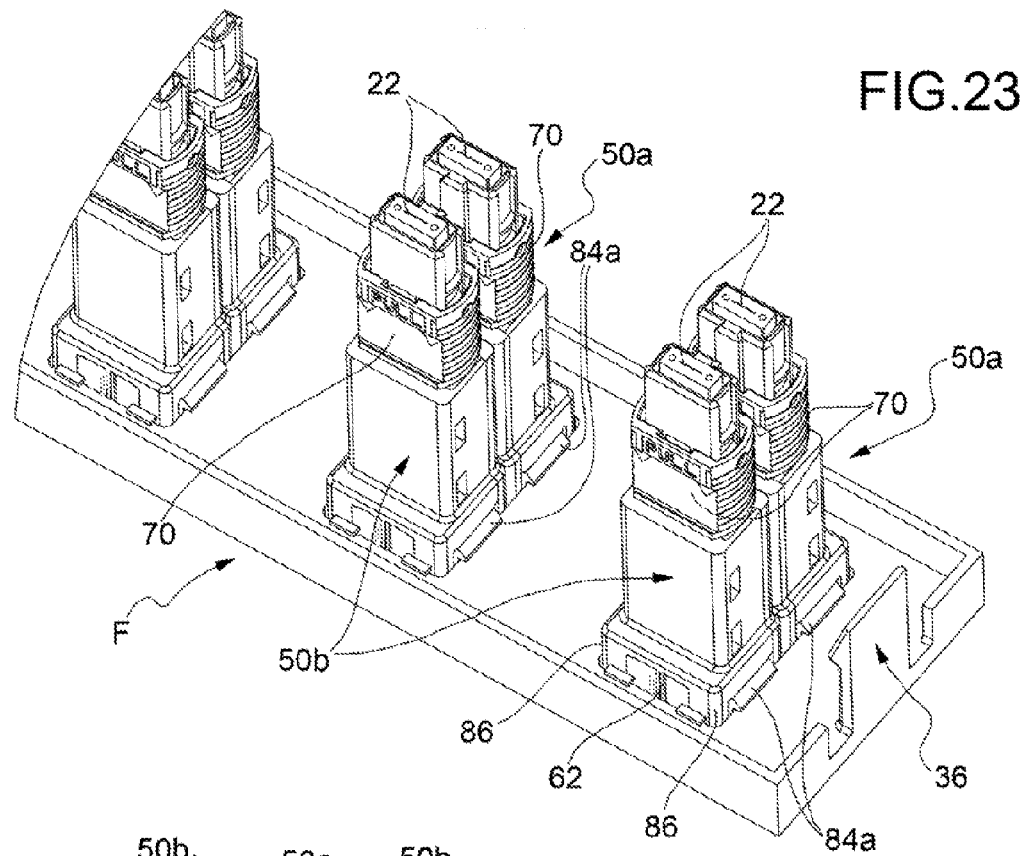
FIGS. 23 and 24 show the coupling of the connectors of FIGS. 19-22 to the frame.
Figure 24:
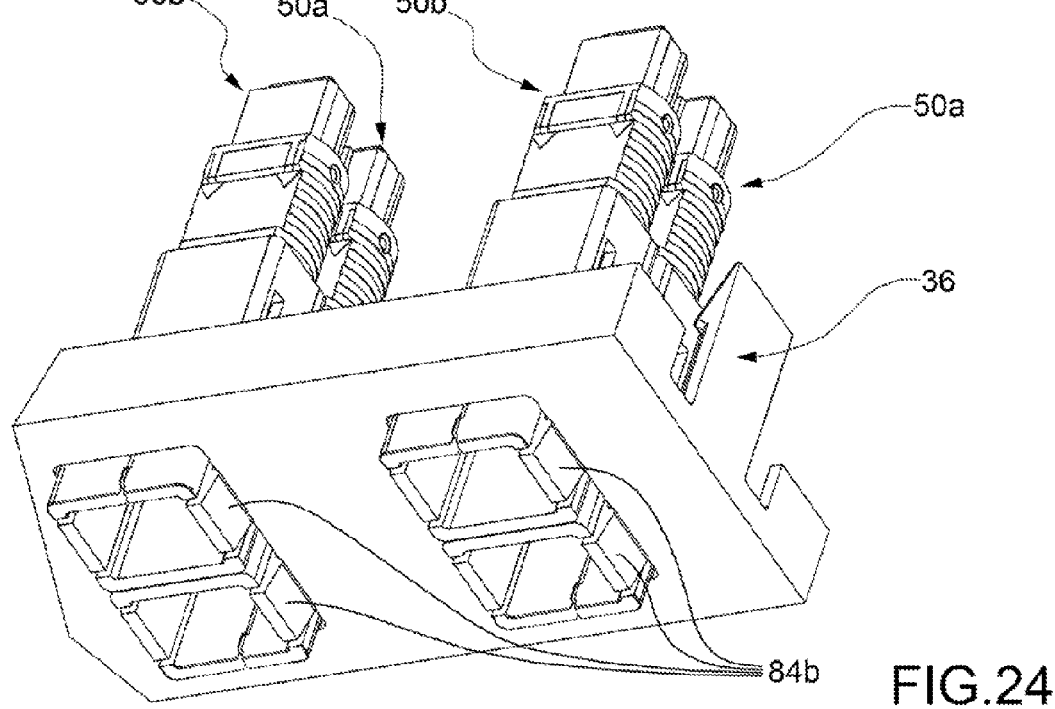

Finally, the connector case 52 of each connector 50a, 50b performs other functions, such as a stable coupling function with the corresponding connector seat 34, by hooking means that allow assembling it to the frame plate. For example, such means comprise a pair of side notches 80 forming seats for corresponding engaging tabs obtained on the inner perimeter of the seat 34 or, as shown in the FIGS. 19-22 with reference to the currently preferred embodiment of connector units 50a, 50b of FIGS. 19-22, a pair of oscillating side tabs 82, integral to the half-shell 52a of the connector case, each of which has pairs of teeth or similar opposite coupling formations 84a, 84b at a distance corresponding to the thickness of the frame plate 32, which the pairs of teeth hold on opposite side in a snap coupling, as illustrated in the FIGS. 23 and 24. It also allows the assembling to the backplane connection seats, further reinforcing the fastening of the frame to the backplane.

In this embodiment, the connector case 52 of each connector 50a, 50b has integral deflection formations 86 of the optical fiber arrangements, consisting of shaped edges of the connector body, according to an embodiment alternative to the one shown in the preceding figures.

Figure 25:
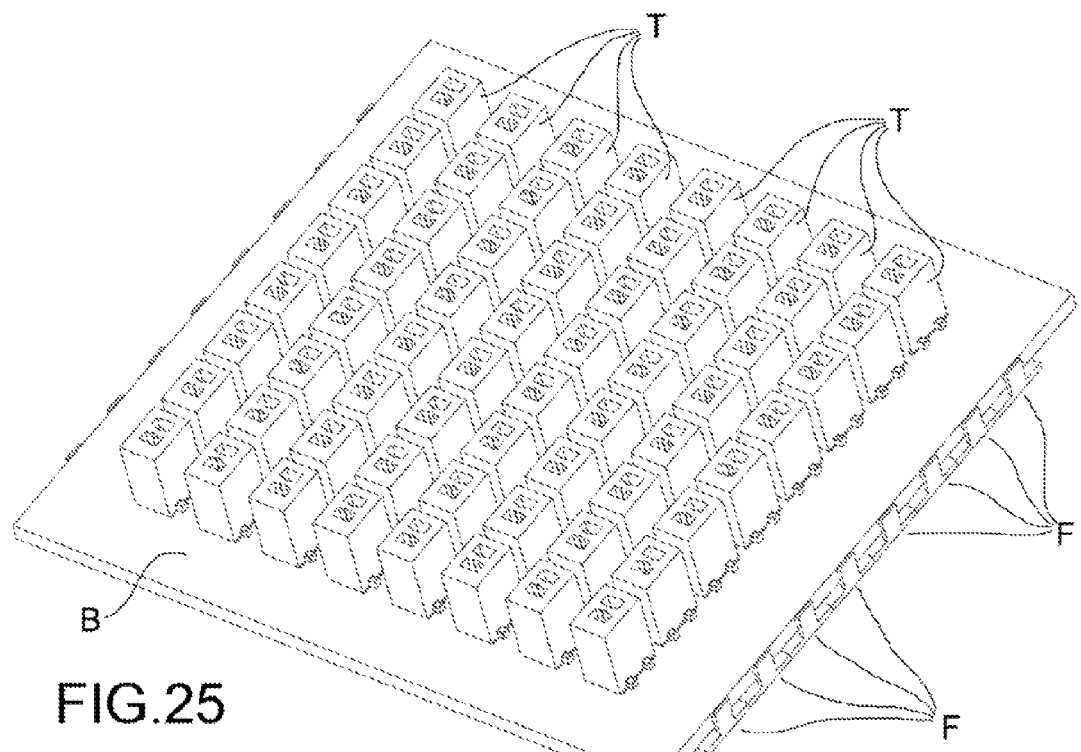
FIGS. 25-27 show a complete interconnection system according to the invention.
Figure 26:
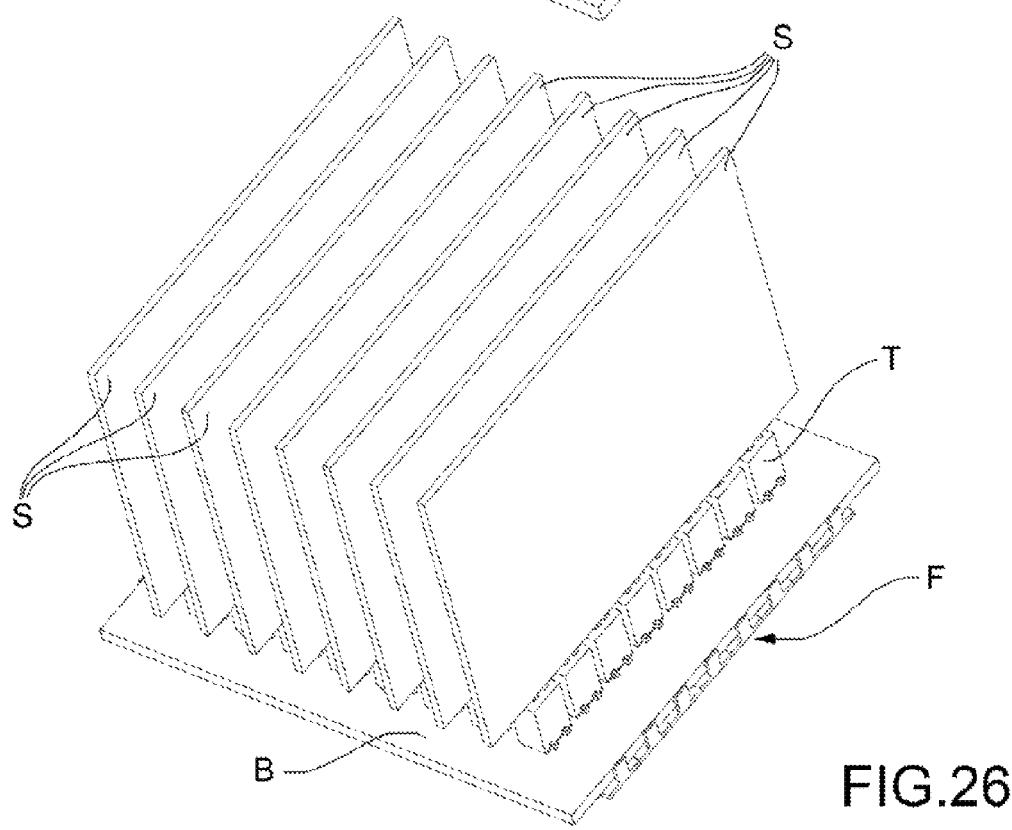
Figure 27:
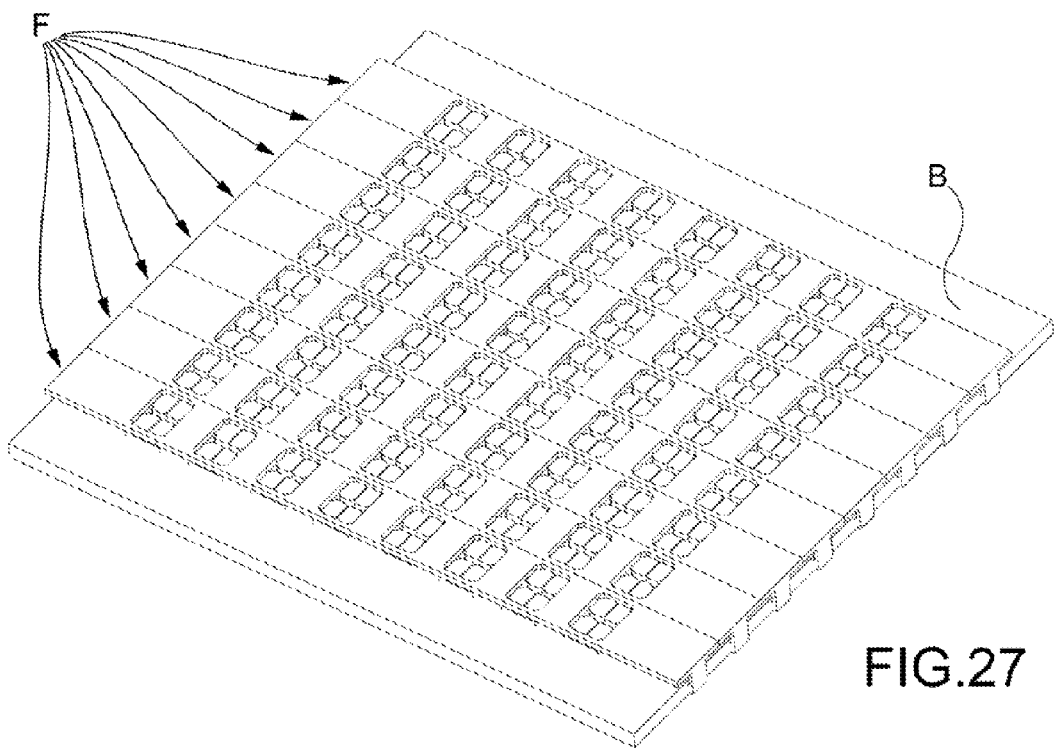

FIGS. 25-27 show a complete interconnection system, in which a backplane board B is illustrated, carrying on a side the matrix of connector units T for switching boards S, shown in the assembled condition in FIG. 26, and on the opposite side a complete set of optical interconnection assemblies according to the invention, best seen in FIG. 27, of which only the corresponding support frames F are visible, the interconnection circuits being hold in the gap created between the support frames and the side of the backplane board.

The optical interconnection assembly according to the invention, comprising the frame F, the connectors 50a, 50b, and the optical interconnection circuit composed of the plurality of fiber optic ribbons R1-R8 may be left open, i.e., with visible ribbons, or in an implementation variant, it may be closed with an additional protective shell (not shown).

Figure 28:
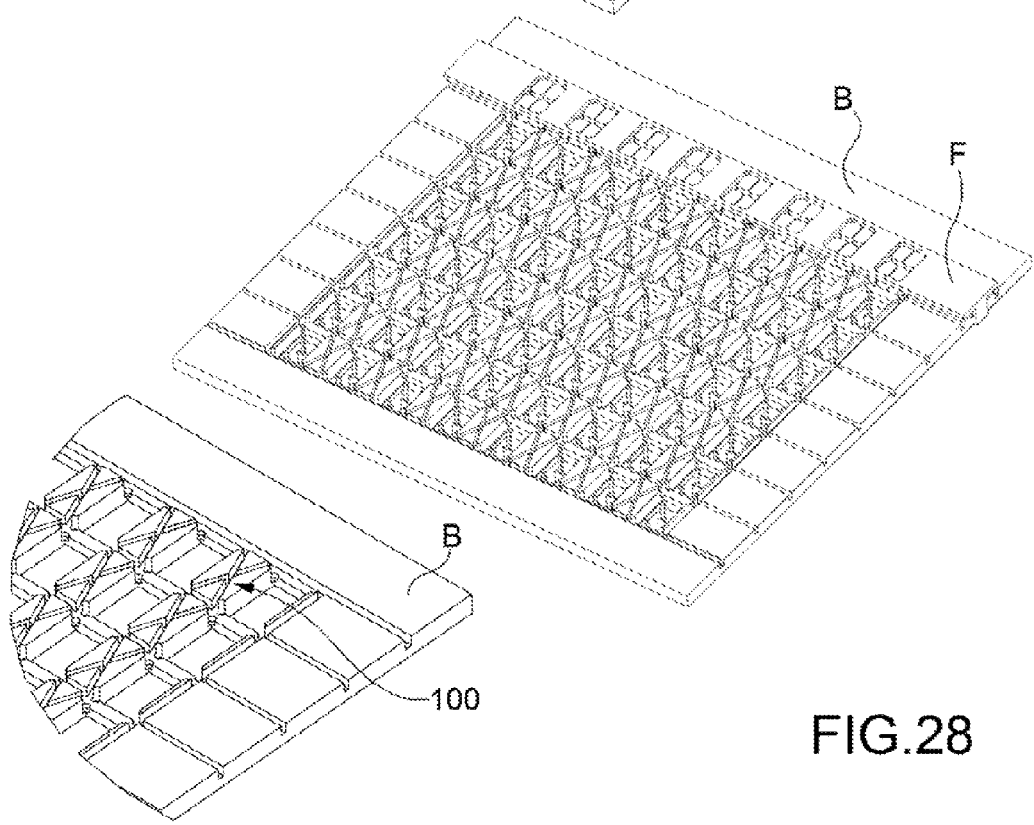
FIG. 28 shows a preferred embodiment of a common support board, backplane, for an interconnection system according to the invention.

In a further advantageous embodiment, the backplane board B is provided with grooves or slits 100, shown in FIG. 28 on the side facing said optical interconnection assemblies, adapted to house at least a portion in height of the fiber optic ribbons R of the interconnection circuit.

In brief, the innovative and advantageous aspects of the solution that is the subject of the present invention, compared to the prior art, are as follows:

exclusive use of commercial fiber optic ribbons;
the ribbon fibers are not in any way altered, machined, or separated; the ribbon remains integral;
the interconnection circuit extend entirely on a plane parallel to that of the backplane and with minimum overall dimensions;
the interconnection circuit exploits at best the mechanical characteristics of the ribbons, in terms of flexural and torsional ability (flexural and torsional rigidity);
all the interconnection circuits use the same constraint scheme (deflection means) embedded in a frame, whereby the same type of frame is used to implement all the interconnection circuits in the system;
the interconnection circuits are implemented by routing the ribbons by means of the aid of controlled deformation guide means, which are dimensioned so as to make the possible optical losses due to the curvature predictable and repeatable.

The invention also relates to an automatic assembling method of an interconnection circuit comprising a plurality of fiber optic ribbons to a support frame in order to build finished interconnection assemblies in an industrial process. Such method consists in the following steps:

determining the length of each ribbon between a first and a second corresponding connector as a function of a preset connection scheme;
handling the ribbons and inserting each of them in the corresponding first and second connectors by controlled folding and torsion, as a function of preset geometric configuration parameters, particularly as a function of the preset distance between the ribbon section passing through the slit of the connector case and the crimping section of the ribbon;
deposition of the ribbons in a temporary arrangement for building of the optical interconnection circuit according to said interconnection scheme, by positioning the connectors in temporary sites;
moving the interconnection circuit from the temporary arrangement to a final arrangement;
transferring the interconnection circuit in the final arrangement to the frame with consequent tensioning of the ribbons, to build a finished interconnection assembly;
extracting, storing, and classifying the finished interconnection assemblies, in view of a successive assembling on backplane boards.

The automatic deposition of the ribbons for building of the optical interconnection circuit according to a preset interconnection scheme in a temporary arrangement comprises, for each fiber optic ribbon of the interconnection circuit, the positioning of a first and a second connector in a corresponding temporary site, in which the temporary sites of the connectors of an optical interconnection assembly are determined by arranging the pairs of first and second connectors of each ribbon in an aligned position, mutually offset in parallel lines, in which the ribbon lays in a slack condition, except for the pair of first and second connectors connected by a ribbon intended to follow a trajectory folded by 180 degrees about two peripheral deflection pins of the frame (for example, the positions TX3-RX6, TX7-RX2, and TX6-RX1 of FIG. 13).

Figure 29:
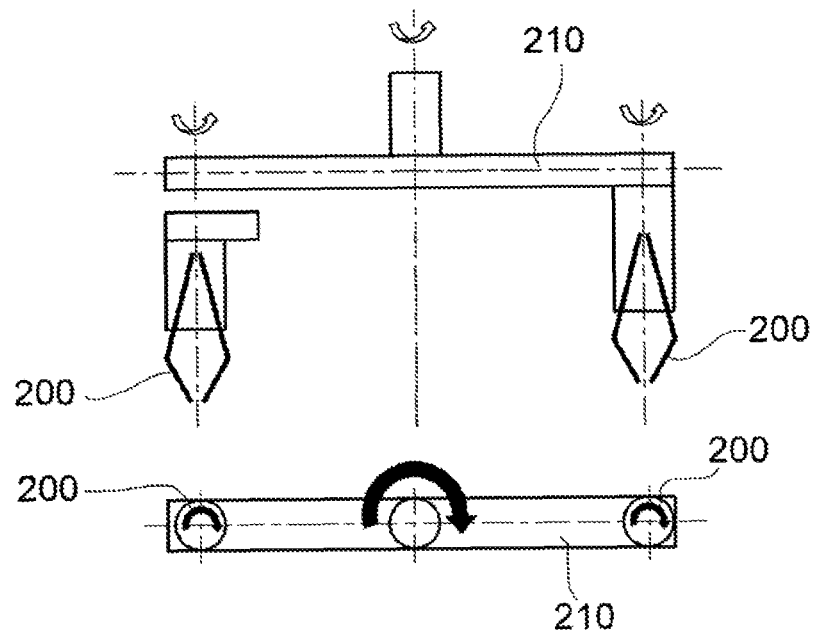
FIG. 29 schematically shows a Cartesian axis handling apparatus for gripping and arranging connectors and fiber optic ribbons to build an optical interconnection assembly in accordance with the invention, according to a preset routing.

This operation can be easily performed, for example, by means of a cartesian axis handling apparatus schematically shown in FIG. 29, in a side, top view, including a pair of devices 200 for gripping the connectors, which are synchronized, suspended from a support beam 210 that is free to rotate about a vertical axis, having a rotational degree of freedom about its own local vertical axis, and at least one degree of freedom in a horizontal translation along said support beam, in order to be selectively able to be moved near to or away from each other along an alignment direction of the connectors. The gripping devices 200 are arranged to grip a corresponding first or second connector from a warehouse, and to release said first and second connectors in a corresponding temporary site for the positioning on a base 220.

Figure 30:
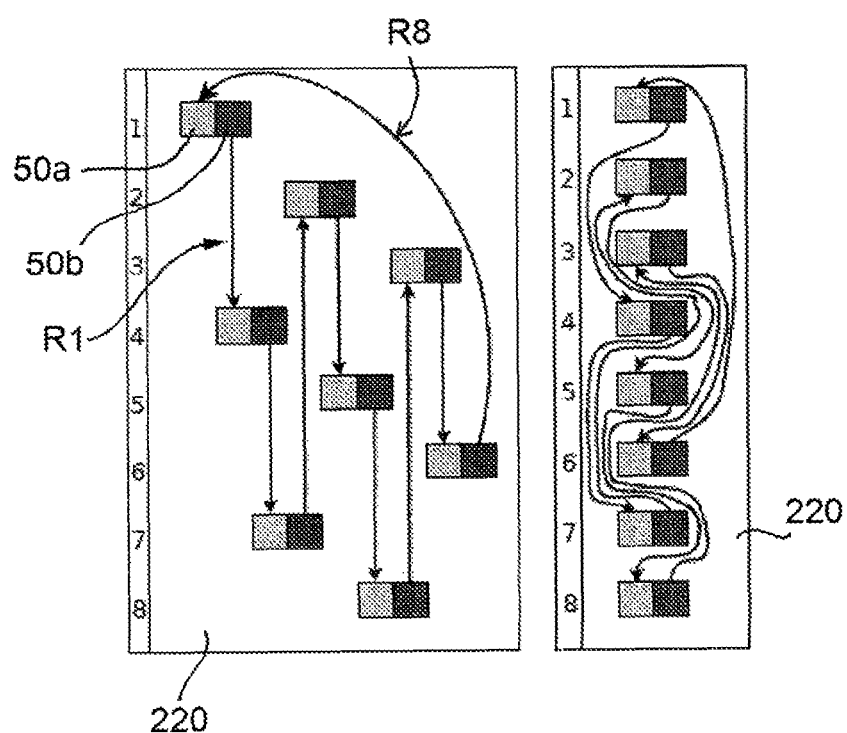
FIG. 30 schematically shows a temporary arrangement and a final arrangement of connector assemblies, respectively in the "open" condition and in the "closed" condition.

In FIG. 30 a temporary arrangement and a final arrangement of connector units are schematically shown, respectively in the "open" condition and in the "closed" condition, in which the numbers 1 to 8 indicate the positions of the connectors in the rank of connector units forming a connection assembly. The paths of the fiber optic ribbons are shown, by way of illustrative example only, by arrows emerging from a corresponding first connector, which reach a corresponding second connector. Particularly, the rectilinear arrows indicating all the fiber optic ribbons except for one in the temporarily arrangement or open condition, shown in the half left of the image, are not to be meant as tensioned rectilinear trajectories of the corresponding ribbons, but only as an indication of their general extension direction in a non-deformed condition. Those of ordinary skill in the art will easily understand that the fiber optic ribbon in such temporarily arrangement lays in a slack condition in the space, indeed to be able to extend according to a curvilinear trajectory, even tortuous, in the closed condition, shown in the right half of the image.

Figure 31:
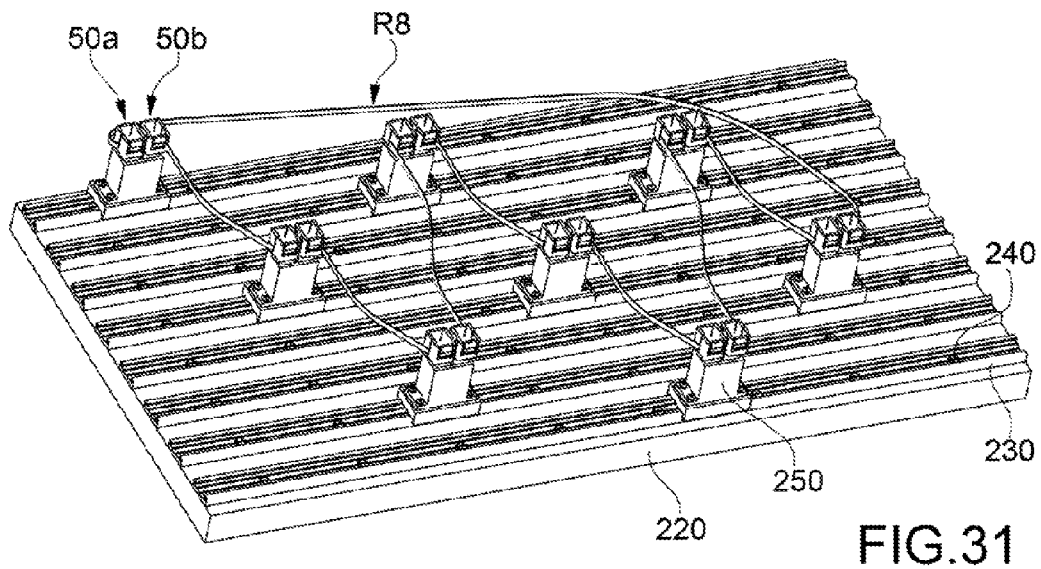
FIGS. 31 to 34 schematically show an exemplary equipment to build an optical interconnection assembly according to the invention.
Figure 32:
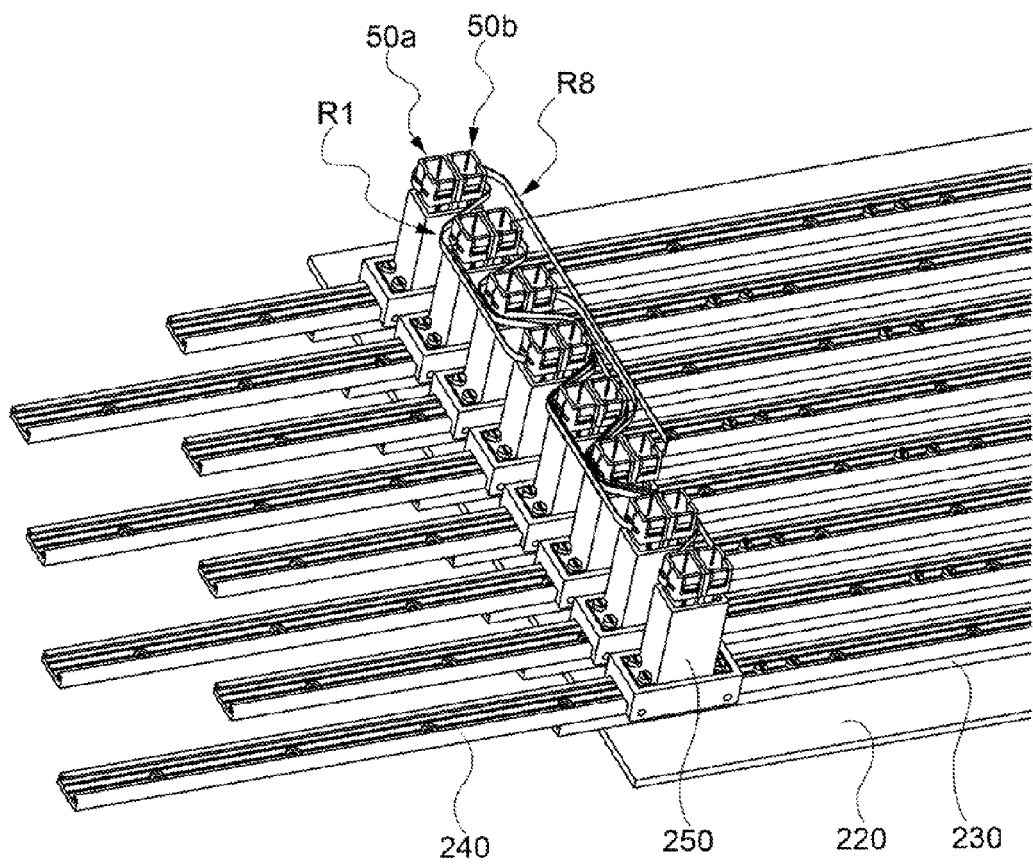

By way of example, in FIGS. 31 and 32, an arrangement for the formation of a preset optical interconnection circuit is shown, respectively in the "open" and "closed" conditions. On a base 220, a plurality of parallel guides or rails 230 is arranged, each of which is adapted to slidably receive a corresponding slide 240 carrying in a preset fixed position (temporary site) a receptacle 250 for temporarily housing the first and second connectors 50a, 50b according to the invention, aligned parallel to the guide extension direction. Each receptacle 250 suitably represents a connector unit T of a backplane board B.

Figure 33:
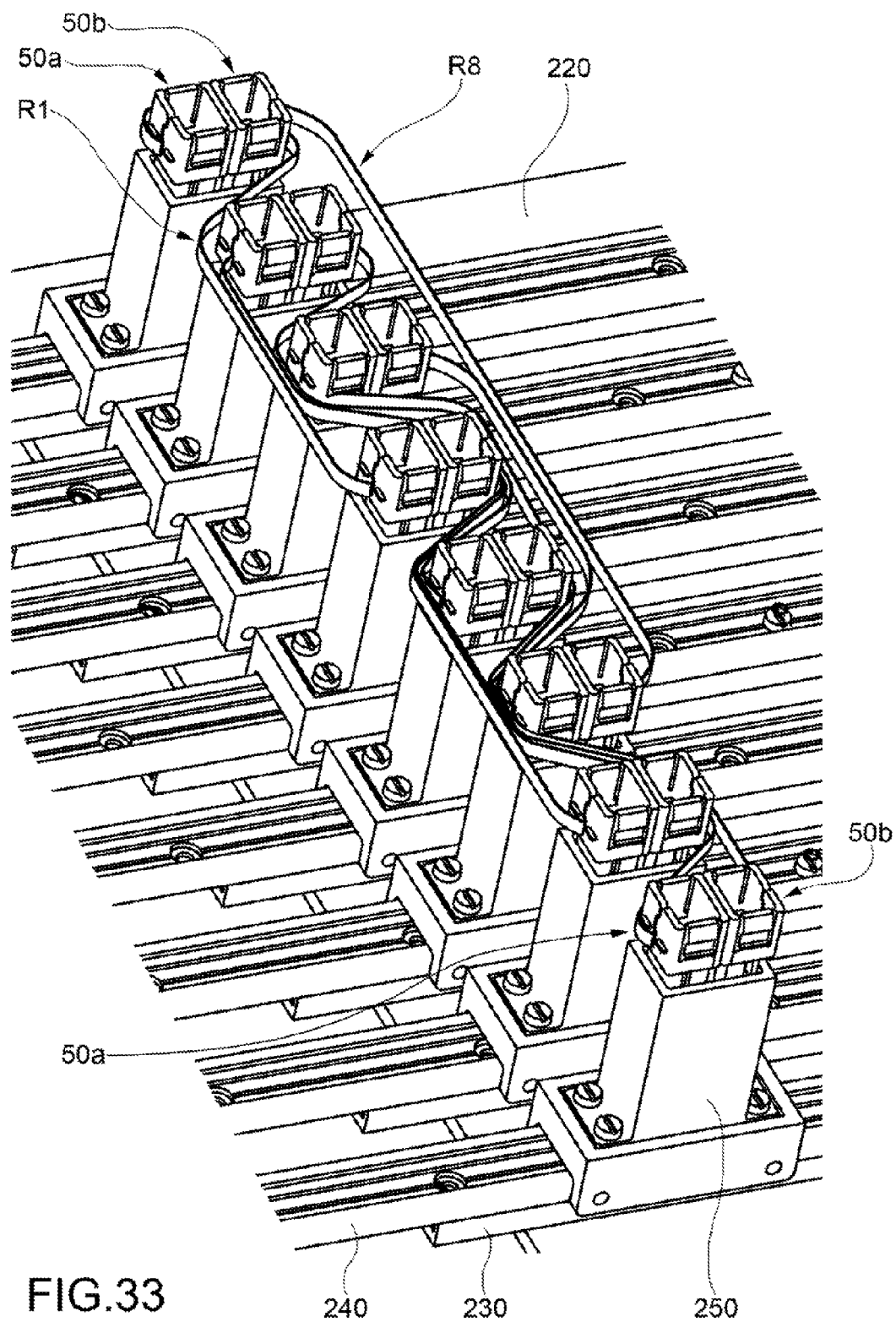
Figure 34:
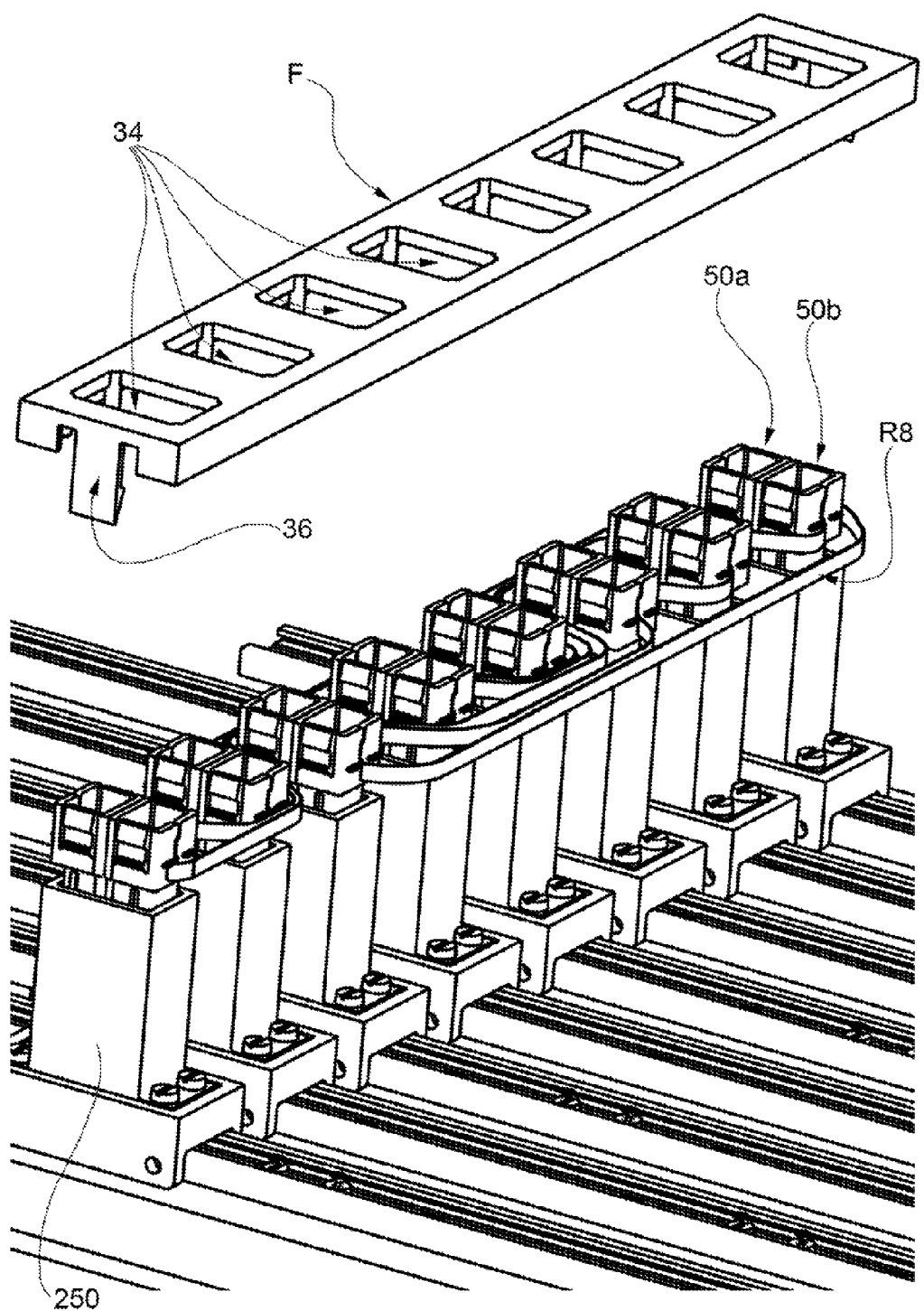

This equipment makes the automatic positioning of the crimping fiber optic ribbons easier. The ribbons can be easily aligned between corresponding opposite first and second connectors, without interference of the other ribbons of the interconnection circuit, in the open condition of FIG. 31, in the positions (temporary sites) obtaining the routing of the nth row of an interconnection system, corresponding to the complete routing arrangement of a single interconnection assembly for a frame. Once all the ribbons R1-R8 have been deposited, the mobile slides 240 are translated so as to pack the receptacles 250 in the closed condition of FIG. 32, for example by a pneumatic actuation, starting from the temporary sites in which they were placed by the cartesian handling apparatus towards a completely aligned destination arrangement, in which all the first connectors and all the second connectors are respectively aligned, consistently with the connector seats provided on the frame, and the ribbons take their final trajectories, at least partially nested. FIG. 33 shows an enlarged detail of the connectors and the corresponding ribbons in the closed condition of FIG. 32. Next, the assembly of connectors and interconnection circuit is transferred to a support frame lowered from above as shown in FIG. 34, by virtue of the snap coupling of the connectors 50a, 50b into the corresponding seats on the frame, and, once assembling is completed, moving the frame causes a withdrawal of the connectors form the temporary housing receptacles 250 and the complete interconnection assembly is transferred to a storing warehouse.

It shall be apparent that, the principle of the invention remaining the same, the embodiments and implementation details will be able to be widely varied compared to what has been described and illustrated by way of non-limiting example only, without for this departing from the scope of the invention as defined by the appended claims.

The invention claimed is:

1. An optical interconnection assembly for the mutual connection of a plurality of signal switching circuit boards that are coupled to a common planar support, backplane, comprising:

a planar support frame configured to receive an ordered arrangement of connectors, which includes a series of first connectors arranged to face corresponding signal transmission ports of said boards, and a series of second connectors arranged to face corresponding signal reception ports of said boards, an interconnection circuit housed by the support frame and disposed between corresponding pairs of first and second connectors according to a preset interconnection scheme, wherein said interconnection circuit comprises a plurality of arrangements of aggregated interconnection optical fibers extending along a longitudinal axis of the arrangement; and a controlled deformation guide means of said plurality of optical fiber arrangements configured to establish a corresponding plurality of non-intersecting coplanar paths of said optical fiber arrangements between corresponding pairs of first and second connectors, wherein each optical fiber arrangement of the interconnection circuit extends, in the path between the corresponding first and second connectors, with the longitudinal axis parallel to the plane of the frame, according to a trajectory that has curvatures around folding axes of the arrangement perpendicular to the plane of the frame, having curvature radius higher than a preset threshold value.

2. The interconnection assembly according to claim 1, wherein said arrangements of aggregated optical fibers include planar arrangements of fibers in the form of ribbon cables.

3. The interconnection assembly according to claim 2, wherein each connector comprises a connector case configured to house an end portion of the corresponding optical fiber arrangement, which has, at an output section facing said signal switching circuit boards, a fiber termination element configured to be arranged, in an assembling condition of the connector on the frame, with the longitudinal axis of the optical fiber arrangement orthogonal to the plane of the frame, and at an input section facing said planar support frame an opening for the passage and holding of said optical fiber arrangement orthogonal to the plane of the frame.

4. The interconnection assembly according to claim 3, wherein said fiber termination element comprises a ferrule or similar mechanically rigid element having a substantially rectangular section configured to hold the optical fibers in an aligned condition.

5. The interconnection assembly according to claim 3, wherein said controlled deformation guide means comprise formations of said connector case configured to determine a torsion of the relative planar optical fiber arrangement about its own axis and a curvature of said planar optical fiber arrangement around a transversal axis, so as to bring said optical fiber arrangement orthogonal to the plane of the frame.

6. The interconnection assembly according to claim 3, wherein said controlled deformation guide means comprise outer wall portions of said connector case in the proximity of said opening at the input section, and is configured to form curvature guide surfaces for the optical fiber arrangement coming out from the connector.

7. The interconnection assembly according to claim 3, wherein said controlled deformation guide means comprise a plurality of deflection formations on the support frame, which define corresponding curvature guide surfaces for at least one optical fiber arrangement orthogonal to the plane of the frame.

8. The interconnection assembly according to claim 1, wherein said support frame has a plurality of aligned connector seats, including corresponding openings for housing and holding said connectors.

9. The interconnection assembly according to claim 8, wherein said openings form seats for a first and a second connector.

10. The interconnection assembly according to claim 1, wherein said support frame has means for hooking the frame to the common planar support, backplane, of the signal switching circuit boards.

11. A method of assembling an optical interconnection assembly for the mutual connection of a plurality of signal switching circuit boards that are coupled to a common planar support, backplane, the optical interconnection assembly including a planar support frame configured to receive a plurality of connectors that includes a series of first connectors arranged to face corresponding signal transmission ports of said boards and a series of second connectors arranged to face corresponding signal reception ports of said boards, the support frame being configured to guide the deployment of an interconnection circuit between corresponding pairs of first and second connectors according to a preset interconnection scheme, wherein said interconnection circuit comprises a plurality of arrangements of aggregated interconnection optical fibers extending along a longitudinal axis of the arrangement, the method comprising:

determining the length of each optical fiber arrangement between a corresponding first and second connectors as a function of said connection scheme;

abutting each optical fiber arrangement to a corresponding first and second connectors through a combination of controlled folding and torsion deformations as a function of preset geometric configuration parameters;

deposing the optical fiber arrangements according to a temporary arrangement of the interconnection circuit, said temporary arrangement comprising, for each optical fiber arrangement, the positioning of a first and a second connectors in a corresponding temporary site, said temporary sites being determined by arranging the pairs of first and second connectors of each optical fiber arrangement in an aligned position, mutually offset in parallel lines;

moving said first and second connectors from the temporary sites towards a respectively aligned condition of destination, consistent with the arrangement of connector seats on said frame, wherein said optical fiber arrangements build a final arrangement of an interconnection circuit; and coupling the interconnection circuit according to the final arrangement on said support frame.

12. An optical interconnection system between a plurality of signal switching circuit boards, including:

a common planar support, backplane, carrying on a side a connection matrix with orthogonal ranks, including a plurality of parallel connector arrays, each of which is configured to receive a corresponding signal switching circuit board, and a plurality of optical interconnection assemblies that may be associated with said common planar support, backplane, on the opposite side, for the mutual connection of said plurality of signal switching circuit boards, wherein each of said plurality of optical interconnection assemblies comprises:

a planar support frame configured to receive an ordered arrangement of connectors, which includes a series of first connectors arranged to face corresponding signal transmission ports of said boards, and a series of second connectors arranged to face corresponding signal reception ports of said boards, an interconnection circuit housed by the support frame and disposed between corresponding pairs of first and second connectors according to a preset interconnection scheme, wherein said interconnection circuit comprises a plurality of arrangements of aggregated interconnection optical fibers extending along a longitudinal axis of the arrangement; and a controlled deformation guide means of said plurality of optical fiber arrangements configured to establish a corresponding plurality of non-intersecting coplanar paths of said optical fiber arrangements between corresponding pairs of first and second connectors.

13. The interconnection system according to claim 12, wherein each optical interconnection assembly is associated with the common planar support, backplane, parallel thereto and orthogonal to said arrays of connectors.

14. The interconnection system according to claim 12, wherein said common planar support, backplane, has, on the side facing said optical interconnection assemblies, a plurality of grooves configured to house at least one portion in height of the interconnection optical fiber arrangements of the interconnection circuit of each optical interconnection assembly.

* * * * *